(12) United States Patent
Townsend et al.

(10) Patent No.: US 10,858,558 B2
(45) Date of Patent: Dec. 8, 2020

(54) POLYTHIOL SEALANT COMPOSITIONS

(71) Applicant: 3M INNOVATIVE PROPERTIES COMPANY, St. Paul, MN (US)

(72) Inventors: Erik M. Townsend, South St. Paul, MN (US); Sheng Ye, Woodbury, MN (US); Jonathan D. Zook, Stillwater, MN (US); Michael D. Swan, Lake Elmo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 17 days.

(21) Appl. No.: 16/340,365

(22) PCT Filed: Nov. 3, 2017

(86) PCT No.: PCT/US2017/058976
§ 371 (c)(1),
(2) Date: Apr. 8, 2019

(87) PCT Pub. No.: WO2018/085190
PCT Pub. Date: May 11, 2018

(65) Prior Publication Data
US 2019/0256751 A1 Aug. 22, 2019

Related U.S. Application Data

(60) Provisional application No. 62/416,958, filed on Nov. 3, 2016.

(51) Int. Cl.
| C08F 2/46 | (2006.01) |
|---|---|
| C08F 2/50 | (2006.01) |
| C08G 61/04 | (2006.01) |
| C09J 181/02 | (2006.01) |
| C08K 5/17 | (2006.01) |
| C09K 3/10 | (2006.01) |
| C08L 81/02 | (2006.01) |
| C08K 5/00 | (2006.01) |
| C08K 5/14 | (2006.01) |

(52) U.S. Cl.
CPC ........... C09J 181/02 (2013.01); C08K 5/0025 (2013.01); C08K 5/0041 (2013.01); C08K 5/14 (2013.01); C08K 5/17 (2013.01); C08L 81/02 (2013.01); C09K 3/1012 (2013.01); C09K 2003/1068 (2013.01); C09K 2200/0647 (2013.01)

(58) Field of Classification Search
CPC .......... C09K 3/1012; C09K 2200/0647; C09K 2003/1068; C08K 5/0025; C08K 5/17; C08K 5/0041; C08K 5/14; C08L 81/02; C09J 181/02

USPC ............ 522/24, 7, 6, 189, 184, 71, 1; 520/1
See application file for complete search history.

(56) References Cited

U.S. PATENT DOCUMENTS

| 4,082,712 A | 4/1978 | Dannels |
|---|---|---|
| 4,366,307 A | 12/1982 | Singh |
| 5,302,627 A | 4/1994 | Field |
| 6,057,380 A | 5/2000 | Birbaum |
| 6,087,070 A | 7/2000 | Turner |
| 6,124,371 A | 9/2000 | Stanssens |
| 6,410,628 B1 | 6/2002 | Hall-Goulle |
| 6,444,725 B1 | 9/2002 | Trom |
| 6,486,297 B2 | 11/2002 | Zook |
| 7,622,548 B2 | 11/2009 | Rao |
| 8,729,198 B2 | 5/2014 | Keledjian |
| 8,932,685 B2 | 1/2015 | Keledjian |
| 2011/0190412 A1 | 8/2011 | Studer |
| 2015/0065600 A1 | 3/2015 | Ye |
| 2016/0304759 A9 * | 10/2016 | Keledjian ............... C08L 81/02 |
| 2017/0362434 A1 * | 12/2017 | Ye .......................... B64D 45/02 |
| 2018/0029071 A1 | 2/2018 | Bons |

FOREIGN PATENT DOCUMENTS

| WO | WO-2012021793 A1 * | 2/2012 | ............ C09J 181/02 |
|---|---|---|---|
| WO | WO 2013-151893 | 10/2013 | |
| WO | WO 2014-151708 | 9/2014 | |
| WO | WO 2014-164244 | 10/2014 | |

(Continued)

OTHER PUBLICATIONS

Suyama, K. And Shirai, M., "Photobase Generators: Recent Progress and Application Trend in Polymer Systems" Progress in Polymer Science 34 (2009) 194-209.
Salmi, "Quaternary Ammonium Salts of Phenylglyoxylic acid as Photobase Generators for Thiol-Promoted Epoxide Photopolymerization", Polymer Chemistry,2014, vol. 5, pp. 6577-6583.
International Search report for PCT International Application No. PCT/US2017/058976 dated Feb. 15, 2018, 4 pages.

*Primary Examiner* — Jessica Whiteley
(74) *Attorney, Agent, or Firm* — Philip P. Soo

(57) ABSTRACT

Provided are sealant compositions that include a first component and second component. The first component contains a polysulfide, a polythioether, or a copolymer or combination thereof containing pendant or terminal thiol groups, while the second in component contains an ethylenically-unsaturated compound and either the first or second component further contains a photoinitiator. Alternatively, the second component can contain a polyepoxide and either the first or second component can contain a photolatent base and a photosensitizer. The first or second component further contains a colorant that substantially reflects or substantially transmits light over the wavelength range from 350 nm to 500 nm. These compositions can provide cure-on-demand sealant formulations that comply with Class B sealant regulations on color, provide an acceptable depth of cure, and allow two-part mixing to be easily distinguishable.

15 Claims, No Drawings

(56) References Cited

FOREIGN PATENT DOCUMENTS

| WO | WO 2015-102967 | 7/2015 | | |
|---|---|---|---|---|
| WO | WO 2016-090253 | 6/2016 | | |
| WO | WO 2016-106352 | 6/2016 | | |
| WO | WO-2016106352 A1 * | 6/2016 | ................ | C08F 8/34 |
| WO | WO 2016-176537 | 11/2016 | | |
| WO | WO 2016-176548 | 11/2016 | | |
| WO | WO 2017-004015 | 1/2017 | | |
| WO | WO 2018-005416 | 1/2018 | | |
| WO | WO 2018-057337 | 3/2018 | | |
| WO | WO 2018-085190 | 5/2018 | | |
| WO | WO 2018-085550 | 5/2018 | | |

\* cited by examiner

POLYTHIOL SEALANT COMPOSITIONS

CROSS REFERENCE TO RELATED APPLICATIONS

This application is a national stage filing under 35 U.S.C. 371 of PCT/US2017/058976 filed 30 Oct. 2017, which claims the benefit of U.S. Provisional Patent Application No. 62/416,958, filed 3 Nov. 2016, the, disclosures of which are incorporated by reference in their entirety herein.

FIELD OF THE INVENTION

Provided are polythiol sealant compositions, including polythiol sealant compositions suitable for use in aerospace applications.

BACKGROUND

Traditional polythiol-based aerospace sealants are polymer networks derived from thiol-terminated oligomers that are crosslinked by thiol-to-disulfide oxidation. This curing behavior is achieved by two-part mixing of a first component containing the majority of a polymerizable resin and a second component containing an oxidizing agent. After mixing, the oxidative cure process begins and can reach completion over a period of 30 minutes to 48 hours, depending on the desired open time of the product (the length of time it takes for the composition to become at least partially gelled).

Widely used sealant products include Class B sealants, which are caulk-like pastes that cure to a tough rubbery consistency, with an open time of about 2 hours. These sealants can have excellent physical properties, including low-temperature flexibility, tensile strength and elongation, and fuel resistance, but their curing behavior can lead to bottlenecks during their use by manufacturers. The sealant surface remains tacky for hours after application, necessitating a stoppage in drilling and other work in the area in order to avoid contamination of the sealant surface with metal shavings or other foreign-object debris. For these reasons, a sealant that can be cured to a tack-free surface state on demand has a strong value proposition.

SUMMARY

Provided herein are cure-on-demand sealant compositions based on polythiols, such as polysulfides and polythioethers, that do not use a traditional oxidative cure and can use either a base-catalyzed thiol-epoxy cure or thiol-ene cure. The moderate-speed background cure (to achieve 2 h open time if sealant is left undisturbed) is effected through the inclusion of a tertiary amine catalyst on one side of the two-part formulation. The faster cure-on-demand functionality, which allows a tack-free skin to form upon the application of blue light, is introduced via a photogenerated amidine species.

This different chemistry brings with it new challenges, including previously unknown problems with color characteristics. Lacking a colored metal oxidizing agent such as manganese dioxide, the two sides of the two-part formulation are similar in color not easily distinguished from each other. Such a sealant composition is contraindicated by industry specifications, which require a visual confirmation that the two-part composition has been mixed.

Another issue related to cure-on-demand polysulfide sealants relates to color changes commonly induced by the photocuring reaction. Light curing of these compositions to provide a tack-free skin can produce a marked reddening of the sealant surface. Industry specifications, however, do not allow Class B sealants to have a red or pink color, which represent other sealant classes. Thus, it is desirable to change the visual appearance of the new cure-on-demand sealant formulations such that the two-part mixing is both easily distinguishable and yet not red or pink in color.

Suitable pigments can be included in one part of the sealant formulation before mixing, bestowing a color contrast between the two parts of the composition. Upon mixing, the gradual blending of contrasting colors can be visualized before the entire mixture assumes a homogeneous color to show that mixing is complete. Advantageously, the homogeneous color can be sufficiently prominent to mask any color arising from the photocuring process. Exemplary colorants can be insoluble in both water and organic media to minimize leaching into jet fuel or wash water, and avoid significant absorption of light over wavelengths used to photocure these sealants, thereby preserving an acceptable depth of cure.

In a first aspect, a sealant composition is provided. The sealant composition comprises: a first component comprising a polysulfide, a polythioether, or a copolymer or combination thereof containing pendant or terminal thiol groups; and a second component comprising an ethylenically-unsaturated compound and optionally a peroxide and optionally an amine, wherein the first or second component further comprises: a photoinitiator; and a colorant that substantially reflects or substantially transmits light over the wavelength range from 350 nm to 500 nm.

In a second aspect, a sealant composition is provided, including: a first component is provided, comprising a polysulfide, a polythioether, or a copolymer or combination thereof containing pendant or terminal thiol groups; and a second component comprising a polyepoxide, wherein the first or second component further comprises a photolatent base, a photosensitizer and a colorant that substantially reflects or substantially transmits light over the wavelength range from 350 nm to 500 nm. Optionally, the photolatent base is capable of photochemically generating a first amine and, as a further option, the second component further comprises a second amine.

In a third aspect, a cured composition is obtained by mixing the first and second component.

In a fourth aspect, a method of curing a sealant composition is provided. The method comprises: providing an aforementioned sealant composition; mixing the first and second components with each other; and at least one of: exposing a photoinitiator in the first or second component to visible light to initiate curing of the sealant composition; or allowing the mixed composition to at least partially cure over time under ambient conditions.

In a fifth aspect, a method of curing a sealant composition is provided, comprising: providing an aforementioned sealant composition; mixing the first and second components with each other; and at least one of: exposing a photolatent base present in the first or second component to visible light to generate a first amine, whereby the first amine catalyzes curing of the sealant composition; or allowing the mixed composition to at least partially cure over time under ambient conditions.

DETAILED DESCRIPTION

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

The terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. All publications, patents, and patent documents referred to in this document are incorporated by reference herein in their entirety, as though individually incorporated by reference.

In the methods described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "substituted" as used herein in conjunction with a molecule or an organic group as defined herein refers to the state in which one or more hydrogen atoms contained therein are replaced by one or more non-hydrogen atoms. The term "functional group" or "substituent" refers to a group that can be or is substituted onto a molecule or onto an organic group. Examples of substituents or functional groups include, but are not limited to, a halogen (e.g., F, Cl, Br, and I); an oxygen atom in groups such as hydroxy groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxyamines, nitriles, nitro groups, N-oxides, hydrazides, azides, and enamines; and other heteroatoms in various other groups.

The term "alkyl" as used herein refers to straight chain and branched alkyl groups and cycloalkyl groups having from 1 to 40 carbon atoms, 1 to 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to 20 carbon atoms, or 2 to 12 carbon atoms or, in some embodiments, from 2 to 8 carbon atoms. Examples include, but are not limited to vinyl, —CH=CH (CH$_3$), —CH=C(CH$_3$)$_2$, —C(CH$_3$)=CH$_2$, —C(CH$_3$)=CH(CH$_3$), —C(CH$_2$CH$_3$)=CH$_2$, cyclohexenyl, cyclopentenyl, cyclohexadienyl, butadienyl, pentadienyl, and hexadienyl among others.

The term "acyl" as used herein refers to a group containing a carbonyl moiety wherein the group is bonded via the carbonyl carbon atom. The carbonyl carbon atom is bonded to a hydrogen forming a "formyl" group or is bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. An acyl group can include 0 to 12, 0 to 20, or 0 to 40 additional carbon atoms bonded to the carbonyl group. An acyl group can include double or triple bonds within the meaning herein. An acryloyl group is an example of an acyl group. An acyl group can also include heteroatoms within the meaning herein. A nicotinoyl group (pyridyl-3-carbonyl) is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "aryl" as used herein refers to cyclic aromatic hydrocarbon groups that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain 6 to 14 carbons in the ring portions of the groups. Aryl groups can be unsubstituted or substituted, as defined herein. Representative substituted aryl groups can be mono-substituted or substituted more than once, such as, but not limited to, a phenyl group substituted at any one or more of 2-, 3-, 4-, 5-, or 6-positions of the phenyl ring, or a naphthyl group substituted at any one or more of 2-to 8-positions thereof.

The term "heterocyclyl" as used herein refers to aromatic and non-aromatic ring compounds containing three or more ring members, of which one or more is a heteroatom such as, but not limited to, N, O, and S.

The terms "halo" or "halogen" group, as used herein, by themselves or as part of another substituent, mean, unless otherwise stated, a fluorine, chlorine, bromine, or iodine atom.

The term "number-average molecular weight" ($M_n$) as used herein refers to the ordinary arithmetic mean of the molecular weight of individual molecules in a sample. It is defined as the total weight of all molecules in a sample divided by the total number of molecules in the sample. Experimentally, $M_n$ is determined by analyzing a sample divided into molecular weight fractions of species i having $n_i$ molecules of molecular weight $M_i$ through the formula $M_n = \Sigma M_i n_i / \Sigma n_i$. The $M_n$ can be measured by a variety of well-known methods including gel permeation chromatography, spectroscopic end group analysis, and osmometry. If unspecified, molecular weights of polymers given herein are number-average molecular weights.

The term "cure" as used herein refers to exposing to radiation in any form, heating, or allowing to undergo a physical or chemical reaction that results in hardening or an increase in viscosity. A thermoset material can be cured by heating or otherwise exposing to irradiation such that the material hardens.

The term "solvent" as used herein refers to a liquid that can dissolve a solid, liquid, or gas. Non-limiting examples of solvents are silicones, organic compounds, water, alcohols, ionic liquids, and supercritical fluids.

The term "ambient conditions" as used herein refers to a temperature of approximately 25° C. and a pressure of approximately 1 atmosphere (or 101 kilopascals).

As used herein, the term "polymer" refers to a molecule having at least one repeating unit and can include copolymers.

Sealant Compositions

The present disclosure provides a sealant composition, in various embodiments. Useful sealant compositions can be used for sealing: aircraft structure and electronics, fuel tanks, frames, floor boards, stringers, ribs, skins, fasteners, brackets, faying surfaces, fillets, and equipment mounting (including antennae, pitot tubes, angle-of-attack transducers, pumps, and valves). The provided sealant compositions can be used to protect these components from fretting, corroding, leaking, and/or arcing. The provided sealants can also be used for fairing aerodynamic surfaces on exterior panels of the aircraft.

The provided sealant compositions include a first component and a second component. The first component and the second component can be separate (e.g., unmixed) or mixed (e.g., mixed to any suitable degree, such as substantially homogeneously mixed).

The first and second components are preferably kept separate until such time the sealant product is ready to be used. Provided that reactive species of these components are kept isolated from each other, materials in the sealant composition described herein as being part of the first component can alternatively be employed in part or in whole in the second component or in another component of the sealant composition, and likewise any material described herein as being part of the second component can alternatively be employed in part or in whole in the first component or in another component of the sealant composition.

The weight ratio of the first component to the second component can be any suitable ratio, such as 0.1:1 to 50:1, 0.5:1 to 30:1, or 1:1: to 15:1, or less than, equal to, or greater than 0.1:1, 0.2:1, 0.5:1, 1:1, 2:1, 5:1, 10:1, 15:1, 20:1, 25:1, 30:1, 35:1, 40:1, 45:1 or 50:1. Stated another way, the first and second components can be any suitable proportion of the overall sealant composition. The first component can be 10 wt % to 95 wt % of the sealant composition, 25 wt % to 85 wt %, or 60 wt % to 80 wt % of the overall weight of the sealant composition; or in some embodiments less than, equal to, or greater than 10 wt %, 15, 20, 25, 30, 35, 40, 45, 50, 55, 60, 65, 70, 75, 80, 85, 90, or 95 wt % of the overall weight of the sealant composition. The second component can be any suitable proportion of the sealant composition, such as 1 wt % to 75 wt %, 5 wt % to 65 wt %, or 10 wt % to 40 wt % of the sealant composition, or in some embodiments less than, equal to, or greater than 1 wt %, 2, 5, 10, 15, 20, 25, 30, 35, 40, 45, 50, 55, 60, 65, 70, or 75 wt % of the overall weight of the sealant composition.

Notably, the proportions of the first and second compositions sum to 100% for a two-component sealant composition but may not where the sealant composition is comprised of more than two components.

In some embodiments of the sealant composition, the first component includes a polysulfide, a polythioether, a copolymer thereof, or a combination thereof, that contains pendant or terminal thiol groups. The second component can contain an ethylenically-unsaturated compound and either the first or second component contains a photoinitiator capable of initiating a polymerization reaction to cure the sealant composition.

Polysulfides, Polythioethers, and Copolymers Thereof

Suitable polysulfides, polythioethers, and copolymers thereof include polymers including repeating units that include a sulfide (e.g., —S—S—) or a thioether (e.g., -thio($C_1$-$C_5$)alkylene)-) moiety therein. Suitable polymers are also polythiols that contain two or more pendant or terminal thiol (i.e., —SH) groups. Polysulfides include polymers synthesized, for example, by condensing bis(2-chloroethoxy)methane with sodium disulfide or sodium polysulfide. Polythioethers include polymers synthesized by a condensation reaction of, for example, 2-hydroxyalkyl sulfide monomers such as those described in U.S. Pat. No. 4,366,307 (Singh et al.) and those formed via addition reactions of dithiols and divinylethers such as those described in U.S. Pat. No. 6,486,297 (Zook et al.).

The polysulfide, polythioether, or copolymer thereof can have any suitable molecular weight, such as a number-average molecular weight of 500 g/mol to 5,000 g/mol or 500 g/mol to 1,500 g/mol; or in some embodiments less than, equal to, or greater than 500 g/mol, 600, 700, 800, 900, 1,000, 1,100, 1,200, 1,300, 1,400, 1,500, 1,600, 1,800, 2,000, 2,250, 2,500, 2,750, 3,000, 3,500, 4,000, 4,500, or 5,000 g/mol.

The polysulfide, polythioether, or copolymer thereof can have any suitable thiol content based on the overall weight of the polysulfide, polythioether, or copolymer thereof, such as 0.1 wt % to 20 wt %, 1 wt % to 10 wt %, 1 wt % to 6 wt %, or 1 wt % to 3 wt %; or in some embodiments less than, equal to, or greater than 0.1 wt %, 0.5, 1, 3, 4, 5, 6, 7, 8, 9, 10, 12, 14, 16, 18, or 20 wt %, relative to the overall weight of the polysulfide, polythioether, or copolymer thereof.

The polysulfide, polythioether, copolymer thereof, or combination thereof can form any suitable proportion of the first component, such as 40 wt % to 100 wt % or 50 wt % to 80 wt % of the first component; or in some embodiments or less than, equal to, or greater than 40 wt %, 45, 50, 55, 60, 65, 70, 75, 80, 85, 86, 88, 90, 91, 92, 93, 94, 95, 96, 97, 98, 99, 99.9, or 99.99 wt %, relative to the overall weight of the first component.

The polysulfide, polythioether, copolymer thereof, or combination thereof can form any suitable proportion of the sealant composition, such as 30 wt % to 95 wt % or 40 wt % to 70 wt % of the sealant composition; or in some embodiments less than, equal to, or greater than 40 wt %, 45, 50, 55, 60, 65, 70, 72, 74, 76, 78, 80, 81, 82, 83, 84, 85, 86, 87, 88, 89, 90, 91, 92, 93, 94, or 95 wt %, relative to the overall weight of the sealant composition.

Ethylenically-Unsaturated Compounds

In primary embodiments of the sealant compositions, the second component comprising an ethylenically-unsaturated compound and optionally a peroxide and optionally an amine, wherein the first or second component further includes a photoinitiator.

As used herein, ethylenically-unsaturated compounds have a carbon-carbon double bond and/or carbon-carbon triple bond that is reactive and generally not part of an aromatic ring. In some embodiments, the carbon-carbon double and triple bonds are terminal groups in a linear aliphatic compound. Ethylenically-unsaturated compounds can include styryl groups and allyl-substituted aromatic rings. The ethylenically-unsaturated compound may also include one or more ether (i.e., —O—), thioether (i.e., —S—), amine (i.e., —N—R1—), or ester (e.g., so that the compound is an acrylate or methacrylate) groups and one or more alkoxy or hydroxyl sub stituents.

In some embodiments, the unsaturated compound does not include ester groups or carbonate groups. That is, the unsaturated compound is not an acrylate, methacrylate, vinyl ester, or vinyl carbonate. Unsaturated compounds without ester and carbonate groups may be more chemically stable than unsaturated compounds that contain these groups. Suitable unsaturated compounds include dienes, diynes, divinyl ethers, diallyl ethers, eneynes, and trifunctional versions of any of these. Combinations of any of the above are possible.

Examples of suitable vinyl ethers having two or more vinyl ether groups include divinyl ether, ethylene glycol divinyl ether, butanediol divinyl ether, hexanediol divinyl ether, diethylene glycol divinyl ether, triethylene glycol divinyl ether, tetraethylene glycol divinyl ether, cyclohexanedimethanol divinyl ether, polytetrahydrofuryl divinyl ether, trimethylolpropane trivinyl ether, pentaerythritol tetravinyl ether, and combinations thereof. Useful divinyl ethers of formula $CH_2=CH-O-(-R2-O-)_m-CH=CH_2$, where R2 is a C2 to C6 branched alkylene and m is an integer from_to_, can be prepared by reacting a polyhydroxy compound with acetylene. Examples include compounds where R2 is an alkyl-substituted methylene group such as —CH(CH$_3$)— (e.g., those obtained from BASF, Florham Park, N.J, under the trade designation "PLURIOL," for which R2 is ethylene and m is 3.8) or an alkyl-substituted ethylene (e.g., —CH$_2$CH(CH$_3$)— such as those obtained from International Specialty Products of Wayne, N.J. under the trade designation "DPE").

Other suitable examples of unsaturated compounds having more than one carbon-carbon double bond or carbon-carbon triple bond include triallyl-1,3,5-triazine-2,4,6-trione, 2,4,6-triallyloxy-1,3,5-triazine, 4-vinyl-1-cyclohexene, 1,5-cyclooctadiene, 1,6-heptadiyne, 1,7-octadiyne, diallyl phthalate, Bisphenol A diallyl ether, allylpentaerythritol, and trimethylolpropane diallyl ether.

In some embodiments, the first components uses a mixture of unsaturated compounds, where at least one unsaturated compound has two carbon-carbon double or triple bonds, and at least one unsaturated compound has at least three carbon-carbon double or triple bonds. Combinations of unsaturated compounds having at least 5 percent functional equivalents of carbon-carbon double or triple bonds contributed by polyenes having at least three carbon-carbon double or triple bonds may also be useful.

The amounts of the polythiol(s) and ethylenically-unsaturated compound(s) can be selected such that there is a stoichiometric equivalence of thiol groups and carbon-carbon double and triple bonds.

One or more ethylenically-unsaturated compounds can form any suitable proportion of the second component, such as 10 wt % to 100 wt %, 30 wt % to 80 wt %, or 50 wt % to 70 wt % of the second component; or in some embodiments less than, equal to, or greater than 10 wt %, 15, 20, 25, 30, 35, 40, 45, 50, 55, 60, 65, 70, 75, 80, 85, or 90; or less than or equal to 100 wt %, relative to the overall weight of the second component.

Photoinitiators

The sealant compositions of the present disclosure can be at least partially cured on demand by free-radical polymerization. To provide one mechanism to initiate this polymerization, the first or second component of these compositions can include a free-radical photoinitiator.

In some embodiments, the free radical photoinitiator is a cleavage-type photoinitiator. Cleavage-type photoinitiators include acetophenones, alpha-aminoalkylphenones, benzoin ethers, benzoyl oximes, acylphosphine oxides and bisacylphosphine oxides and combinations thereof.

Examples of useful photoinitiators include benzoin ethers (e.g., benzoin methyl ether or benzoin butyl ether); substituted acetophenone (e.g., 2,2-dimethoxy-2-phenylacetophenone or 2,2-diethoxyacetophenone); 1-hydroxycyclohexyl phenyl ketone; and acylphosphonate derivatives (e.g., bis(2, 4,6-trimethylbenzoyl)phenylphosphine oxide, diphenyl-2,4, 6-trimethylbenzoylphosphine oxide, isopropoxyphenyl-2,4, 6-trimethylbenzoylphosphine oxide, or dimethyl pivaloylphosphonate). Many photoinitiators are available, for example, from BASF under the trade designation "IRGACURE". The photoinitiator may be selected, for example, based on the desired wavelength for curing and compatibility with the curable composition. When using a photoinitiator, the composition is typically curable using an actinic light source. Two or more of any of these photoinitiators may also be used together in any combination.

One or more photoinitiators can be provided in the second component in any amount suitable to initiate curing of the sealant composition. The one or more photoinitiators can form any suitable proportion of the second component, such as 20 wt % to 80 wt %, or 30 wt % to 60 wt %, or 20 wt % or less, or in some embodiments less than, equal to, or greater than 25 wt %, 30, 32, 34, 36, 38, 40, 42, 44, 46, 48, 50, 52, 54, 56, 58, 60, 65, 70, 75, or 80 wt %, relative to the overall weight of the second component.

More broadly, the one or more photoinitiators can form any suitable proportion of the sealant composition, such as 0.01 wt % to 10 wt %; 0.1 wt % to 7 wt %; 0.5 wt % to 3 wt %; or in some embodiments less than, equal to, or greater than 0.01 wt %, 0.05, 0.1, 0.2, 0.5, 0.7, 1, 1.5, 2, 2.5, 3, 3.5, 4, 4.5, 5, 6, 7, 8, 9, or 10 wt %, relative to the overall weight of the sealant composition.

Peroxides and Related Amines

The first or second composition optionally further includes an organic or inorganic peroxide, which can assist in curing of the sealant compositions through oxidative coupling of the pendant or terminal thiol groups. The organic and inorganic peroxides may be heat-activated to initiate curing. Suitable organic peroxides include, for example, benzoyl peroxide and t-butyl peroxide.

In various embodiments, the provided sealant compositions include an organic hydroperoxide. Organic hydroperoxides have the general structure R—OOH, wherein R is an alkyl group, aryl group, arylalkylene group, alkylarylene group, alkylarylenealkylene group, or a combination thereof. Examples of useful organic hydroperoxides include cumene hydroperoxide, tert-butyl hydroperoxide, tert-amyl hydroperoxide, 1,1,3,3-tetramethylbutyl hydroperoxide, isopropylcumyl hydroperoxide, p-menthane hydroperoxide (i.e., 1-methyl-1-(4-methylcyclohexyl)ethyl hydroperoxide), diisopropylbenzene hydroperoxide (e.g., 3,5-diisopropylhydroperoxide). In some embodiments, the organic hydroperoxide includes a ketone peroxide (e.g., methyl ethyl ketone peroxide, acetone peroxide, and cyclohexanone peroxide). In some embodiments, the organic hydroperoxide is other than methyl ethyl ketone peroxide. In some embodiments, the organic hydroperoxide is other than a ketone peroxide. Two or more of any of these organic hydroperoxides may also be used together in any combination. While organic hydroperoxides tend to be some of the more stable peroxides and require some of the highest temperatures for thermal initiation, in the presence of a polythiol and unsaturated compound in the composition of the present disclosure, the organic hydroperoxide can initiate curing under ambient conditions. In some embodiments, polythiols can reduce organic hydroperoxides to generate radicals through a redox curing mechanism.

The peroxide can be added in any amount suitable to initiate curing. In some embodiments, the peroxide is present in an amount in a range from 0.1 wt % to 10 wt % (in some embodiments, 0.25 wt % to 5 wt %, or 0.5 wt % to 3 wt %) of the sealant composition. In some embodiments, the peroxide can be present in an amount less than, equal to, or greater than 0.01, 0.05, 0.1, 0.25, 0.5, 1, 1.5, 2, 2.5, 3, 3.5, 4, 4.5, 5, 6, 7, 8, 9, or 10 wt %, relative to the overall weight of the sealant composition.

The type of organic hydroperoxide and its amount may be selected to provide the composition with a desirable amount of open time after it is mixed or thawed. In some embodiments, the composition has an open time of at least 5 minutes, at least 10 minutes, at least 20 minutes, at least 30 minutes, at least one hour, or at least two hours.

Optionally, the second component further includes an added amine. In some embodiments, a combination of the added amine and organic hydroperoxide operates as a redox initiator. The nitrogen atom(s) in the amine can be bonded to alkyl groups, aryl groups, arylalkylene groups, alkylarylene, alkylarylenealkylene groups, or a combination thereof.

In various embodiments, the amine is a cyclic compound, which can include one or more rings and can be aromatic or non-aromatic (e.g., saturated or unsaturated). Cyclic amines can include a nitrogen as at least one of the atoms in a 5- or 6-membered ring. In some embodiments, the amine includes only carbon-nitrogen, nitrogen-hydrogen, carbon-carbon, and carbon-hydrogen bonds. In some embodiments, the amine can be substituted with at least one of alkoxy, aryl, arylalkylenyl, haloalkyl, haloalkoxy, halogen, nitro, hydroxy, hydroxyalkyl, mercapto, cyano, aryloxy, arylalkyleneoxy, heterocyclyl, or hydroxyalkyleneoxyalkylenyl.

In some embodiments, the amine is a tertiary amine. Examples of useful tertiary amines include triethylamine, dimethylethanolamine, benzyldimethylamine, dimethylaniline, tribenzylamine, triphenylamine, N,N-dimethyl-para-toluidine, N,N-dimethyl-ortho-toluidine, tetramethylguanidine ("TMG"), 1,8-diazabicyclo[5.4.0]undec-7-ene ("DBU"), 1,5-diazabicyclo[4.3.0]non-5-ene ("DBN"), 1,4-diazabicyclo[2.2.2]octane ("DABCO"), quinuclidine, dimethylaminomethyl phenol, tris(dimethylaminomethyl)phenol, N,N-dihydroxyethyl-p-toluidine, N,N-diisopropylethylamine, and N, N, N', N", N"-pentamethyl-diethylenetriamine. In some embodiments, the amine is other than dihydroxyethyl-p-toluidine, N,N-diisopropylethylamine, and N, N, N', N", N"-pentamethyl-diethylenetriamine. Useful amines also include guanidines such as diphenylguanidine ("DPG"). In some embodiments, the amine is a tertiary amines (including amidines) or guanidines.

In some embodiments, the amine comprises a substituted or unsubstituted nitrogen-containing ring. In some embodiments, the substituted or unsubstituted nitrogen-containing ring has 5 or 6 atoms in the ring. The substituted or unsubstituted nitrogen-containing ring can be aromatic or nonaromatic and can have up to 4 nitrogen atoms in the ring. The ring can optionally include other heteroatoms (e.g., S and O). Substituted aromatic or nonaromatic rings can be substituted by one or more substituents independently selected from the group consisting of alkyl, aryl, arylalkylenyl, alkoxy, haloalkyl, haloalkoxy, halogen, nitro, hydroxy, hydroxyalkyl, mercapto, cyano, aryloxy, arylalkyleneoxy, heterocyclyl, hydroxyalkyleneoxyalkylenyl, amino, alkylamino, dialkylamino, (dialkylamino)alkyleneoxy, and oxo. The alkyl substituent can be unsubstituted or substituted by at least one of alkoxy having up to 4 carbon atoms, halo, hydroxy, or nitro. In some embodiments, the aryl or arylalkylenyl is unsubstituted or substituted by at least one of alkyl having up to 4 carbon atoms, alkoxy having up to 4 carbon atoms, halo, hydroxy, or nitro.

In some embodiments, the amine is a substituted or unsubstituted pyridine, pyrazine, imidazole, pyrazole, tetrazole, triazole, oxazole, thiazole, pyrimidine, pyridazine, triazine, tetrazine, or pyrrole. Any of these may be substituted with halogen (e.g., iodo, bromo, chloro, fluoro), alkyl (e.g., having from 1 to 4, 1 to 3, or 1 to 2 carbon atoms), arylalkylenyl (e.g., benzyl), or aryl (phenyl). In some embodiments, the amine, is a substituted or unsubstituted imidazole or pyrazole. The imidazole or pyrazole may be substituted with halogen (e.g., iodo, bromo, chloro, fluoro), alkyl (e.g., having from 1 to 4, 1 to 3, or 1 to 2 carbon atoms), arylalkylenyl (e.g., benzyl), or aryl (phenyl). Examples of useful nitrogen-containing rings include 1-benzylimidazole, 1,2-dimethylimidazole, 4-iodopyrazole, 1-methylbenzimidazole, 1-methylpyrazole, 3-methylpyrazole, 4-phenylimidazole, and pyrazole.

The amine and its amount may be selected to provide the composition with a desirable amount of open time (that is, the length of time it takes for the composition to become at least partially gelled) after it is mixed or thawed. The amount of the amine and its conjugate acid pKa can both affect the open time. For example, a composition with a smaller amount of an amine having a higher pKa may have the same open time as a composition having a larger amount of an amine having a lower pKa.

In some embodiments, the amine can be present in an amount of from 0.05 wt % to 10 wt %, 0.1 wt % to 5 wt %, or 0.5 wt % to 5 wt %, relative to the overall weight of the sealant composition. In some embodiments, for example, when the amount of inorganic filler present in the composition is at least 25% or at least 30% by weight, the amine can be present in an amount in a range from 1 wt % to 5 wt %, 2 wt % to 5 wt %; or in some embodiments less than, equal to, or greater than 0.0005 wt %, 0.001, 0.005, 0.01, 0.05, 0.1, 0.5, 1, 1.5, 2, 2.5, 3, 3.5, 4, 4.5, or 5 wt %, relative to the overall weight of the sealant composition.

Polyepoxides

In secondary embodiments of the sealant composition, the second component can contain a polyepoxide instead of an ethylenically-unsaturated compound. In these embodiments, the first and/or second component contains a photolatent base and the first and/or second component optionally contains a photosensitizer.

Useful polyepoxides can have more than one epoxide group. In some embodiments, the polyepoxide is monomeric. In some embodiments, the polyepoxide is oligomeric or polymeric (i.e., an epoxy resin). A monomeric polyepoxide may be an alkylene, arylene, alkylarylene, arylalkylene, or alkylenearylalkylene having at least two epoxide groups, wherein any of the alkylene, alkylarylene, arylalkylene, or alkylenearylalkylene are optionally interrupted by one or more ether (i.e., —O—), thioether (i.e., —S—), or amine (i.e., —NR1-) groups and optionally substituted by alkoxy, hydroxyl, or halogen (e.g., fluoro, chloro, bromo, iodo). Useful monomeric polyepoxides may be diepoxides or polyepoxides with three or more epoxide groups (in some embodiments, three or four) epoxide groups. An epoxy resin may be prepared by chain-extending any of such polyepoxides.

Useful polyepoxides can be aromatic. Useful aromatic polyepoxides and epoxy resins typically contain at least one (in some embodiments, at least 2, in some embodiments, in a range from 1 to 4) aromatic ring (e.g., phenyl group) that is optionally substituted by a halogen (e.g., fluoro, chloro, bromo, iodo), alkyl having 1 to 4 carbon atoms (e.g., methyl or ethyl), or hydroxyalkyl having 1 to 4 carbon atoms (e.g., hydroxymethyl). For polyepoxides and epoxy resin repeating units containing two or more aromatic rings, the rings may be connected, for example, by a branched or straight-chain alkylene group having 1 to 4 carbon atoms that may optionally be substituted by halogen (e.g., fluoro, chloro, bromo, iodo). In some embodiments, the aromatic polyepoxide or epoxy resin is a novolac. In these embodiments, the novolac epoxy may be a phenol novolac, an ortho-, meta-, or para-cresol novolac, or a combination thereof. In some embodiments, the aromatic polyepoxide or epoxy resin is a bisphenol diglycidyl ether, wherein the bisphenol (i.e., —O—$C_6H_5$—$CH_2$—$C_6H_5$—O—) may be unsubstituted (e.g., bisphenol F), or either of the phenyl rings or the methylene group may be substituted by halogen (e.g., fluoro, chloro, bromo, iodo), methyl, trifluoromethyl, or hydroxymethyl. In some embodiments, the polyepoxide is a novolac epoxy resin (e.g., phenol novolacs, ortho-, meta-, or para-cresol novolacs or combinations thereof), a bisphenol epoxy resin (e.g., bisphenol A, bisphenol F, halogenated bisphenol epoxies, and combinations thereof), a resorcinol epoxy resin, and combinations of any of these. Examples of useful aromatic monomeric polyepoxides include the diglycidyl ethers of bisphenol A and bisphenol F and tetrakis glycidyl-4-phenylolethane and combinations thereof.

Some useful polyepoxides are aliphatic (i.e., non-aromatic). The non-aromatic epoxy can include a branched or straight-chain alkylene group having 1 to 20 carbon atoms optionally interrupted with at least one —O— and optionally substituted by hydroxyl. In some embodiments, the non-aromatic epoxy can include a poly(oxyalkylene) group having a plurality of oxyalkylene groups, OR1, wherein each R1 is independently C2 to C5 alkylene, in some embodiments, C2 to C3 alkylene, where the number of oxyalkylene groups is in the range of from 2 to 6, 2 to 5, 2 to 4, or 2 to 3.

Examples of useful non-aromatic monomeric polyepoxides include ethylene glycol diglycidyl ether, propylene glycol diglycidyl ether, diethylene glycol diglycidyl ether, dipropylene glycol diglycidyl ether, polyethylene glycol diglycidyl ether, polypropylene glycol diglycidyl ether, glycerol diglycidyl ether, propanediol diglycidyl ether, butanediol diglycidyl ether, and hexanediol diglycidyl ether.

Examples of useful polyepoxides having more than two epoxide groups include glycerol triglycidyl ether, and polyglycidyl ethers of 1,1,1-trimethylolpropane, pentaerythritol, and sorbitol.

Other examples of useful polyepoxides include glycidyl ethers of cycloaliphatic alcohols (e.g., 1,4-cyclohexanedimethanol, bis(4-hydroxycyclohexyl)methane or 2,2-bis(4-hydroxycyclohexyl)propane), cycloaliphatic epoxy resins (e.g., bis(2,3-epoxycyclopentyl) ether, 2,3-epoxycyclopentyl glycidyl ether, 1,2-bi s(2,3-epoxycyclopentyloxy)ethane and 3,4-epoxycyclohexylmethyl 3',4'-epoxycyclohexanecarboxylate), and hydantoin diepoxide.

Examples of polyepoxides having amine groups include poly(N-glycidyl) compounds obtainable by dehydrochlorinating the reaction products of epichlorohydrin with amines containing at least two amine hydrogen atoms. These amines are, for example, aniline, n-butylamine, bis(4-aminophenyl) methane, m-xylylenediamine or bis(4-methylaminophenyl) methane.

Examples of polyepoxides having thioether groups include di-S-glycidyl derivatives of dithiols (e.g., ethane-1, 2-dithiol or bis(4-mercaptomethylphenyl) ether).

In particular embodiments of the provided sealant compositions, the polyepoxide is an oligomeric or polymeric diepoxide. In some embodiments, epoxides may be chain extended to have any desirable epoxy equivalent weight. Chain extending epoxy resins can be carried out by reacting a monomeric diepoxide, for example, with a diol in the presence of a catalyst to make a linear polymer. In some embodiments, the resulting epoxy resin (e.g., either an aromatic or non-aromatic epoxy resin) may have an epoxy equivalent weight of at least 150, 170, 200, or 225 grams per equivalent. In some embodiments, the aromatic epoxy resin may have an epoxy equivalent weight of up to 2000, 1500, or 1000 grams per equivalent. In some embodiments, the aromatic epoxy resin may have an epoxy equivalent weight in a range from 150 to 2000, 150 to 1000, or 170 to 900 grams per equivalent. Epoxy equivalent weights may be selected, for example, so that the epoxy resin may be used as a liquid.

In various embodiments, the polyepoxide can be present in an amount of from 10 wt % to 90 wt %, 20 wt % to 80 wt %, or 30 wt % to 70 wt %, relative to the overall weight of the second component. In various embodiments, the polyepoxide can be present in an amount less than, equal to, or greater than 5 wt %, 10, 15, 20, 25, 30, 35, 40, 45, 50, 55, 60, 65, 70, 75, 80, 85, or 90 wt %, relative to the overall weight of the second component.

Photolatent Base and Related Amines

Where the sealant composition contains one or more polyepoxides, either the first or second component can include a photolatent base. A photolatent base photochemically generates a base that can catalyze the reaction between the polythiol and the polyepoxide. In the compositions and methods disclosed herein, the base is a first amine. In some embodiments, the first or second component contains a second amine, which can be phase-separated within the composition under ambient conditions. The first amine and the second amine can be the same amine or different amines.

The first amine and second amine can independently be any compound including one to four basic nitrogen atoms that bear a lone pair of electrons. The first amine and second amine can independently include primary, secondary, and tertiary amine groups. The nitrogen atom(s) in the first amine and second amine can be bonded to alkyl groups, aryl groups, arylalkylene groups, alkylarylene, alkylaryleneal-kylene groups, or a combination thereof. The first amine and second amine can also be cyclic amines, which can include one or more rings and can be aromatic or non-aromatic (e.g., saturated or unsaturated).

One or more of the nitrogen atoms in the amine can be part of a carbon-nitrogen double bond. In some embodiments, the first amine and second amine independently include only carbon-nitrogen, nitrogen-hydrogen, carbon-carbon, and carbon-hydrogen bonds, while in other embodiments the first amine and second amine can include other functional groups (e.g., hydroxyl or ether group). It is understood, however, that a compound including a nitrogen atom bonded to a carbonyl group is an amide, not an amine, and has different chemical properties from an amine.

The first amine and second amine can also include carbon atoms that are bonded to more than one nitrogen atom. Thus, each of the first amine and second amine can independently be a guanidine or amidine. As would be understood by one skilled in the art, lone pair of electrons on one or more nitrogen atoms of the first amine and second amine distinguishes them from quaternary ammonium compounds, which have a permanent positive charge regardless of pH.

Useful first and second amines include propylamine, butylamine, pentylamine, hexylamine, triethylamine, dimethylethanolamine, benzyldimethylamine, dimethylaniline, tribenzylamine, triphenylamine, tetramethylguanidine ("TMG"), 1,8-diazabicyclo[5.4.0]undec-7-ene ("DBU"), 1,5-diazabicyclo[4.3.0]non-5-ene ("DBN"), 1,4-diazabicyclo[2.2.2]octane ("DABCO"), quinuclidine, diphenylguanidine ("DPG"), dimethylaminomethyl phenol, and tris(dimethylaminomethyl)phenol. In various embodiments, the first amine and second amine are each independently tertiary amines (including amidines) or guanidines.

While the first amine is photochemically generated from a photolatent base, the first and second amines themselves are generally not considered photolatent bases. That is, they do not undergo photochemical reactions that generate an amine by photocleavage, photoelimination, or another mechanism.

Any of a number of photolatent bases can be used to photochemically generate the first amine. Many useful photolatent bases, any of which may be useful for practicing the present disclosure, have been reviewed in Suyama, K. and Shirai, M., "Photobase Generators: Recent Progress and Application Trend in Polymer Systems" *Progress in Polymer Science* 34 (2009) 194-209.

Photolatent bases useful for practicing the present disclosure include photocleavable carbamates (e.g., 9-xanthenylmethyl, fluorenylmethyl, 4-methoxyphenacyl, 2,5-dimethylphenacyl, benzyl, and others), which have been shown to generate primary or secondary amines after photochemical cleavage and liberation of carbon dioxide. Other photolatent bases described in the review as useful for generating primary or secondary amines include certain 0-acyloximes, sulfonamides, and formamides. Acetophenones, benzophenones, and acetonaphthones bearing quaternary ammonium substituents are reported to undergo photocleavage to generate tertiary amines in the presence of a variety of counter cations (borates, dithiocarbamates, and thiocyanates). Examples of these photolatent ammonium salts include N-(benzophenonemethyl)tri-N-alkyl ammonium triphenylborates. Certain sterically hindered α-aminoketones are also reported to generate tertiary amines.

Quaternary ammonium salts made from a variety of amines and phenylglyoxylic acid have been shown to generate amines that catalyze a thiol/epoxy reaction after exposure to UV light. (See Salmi, H., et al. "Quaternary Ammonium Salts of Phenylglyoxylic acid as Photobase Generators for Thiol-Promoted Epoxide Photopolymerization" Polymer Chemistry 5 (2014) 6577-6583.) Such salts are also suitable as photolatent bases useful for practicing the present disclosure.

In some embodiments, the photolatent base useful for practicing the present disclosure is a 1,3-diamine compound represented by the formula N(R7)(R6)-CH(R5)-N(R4)-C(R1)(R2)(R3) such as those described in U.S. Pat. No. 7,538,104 (Baudin et al.). Such compounds can be considered arylalkylenyl substituted reduced amidines or guanidines. In formula N(R7)(R6)-CH(R5)-N(R4)-C(R1)(R2)(R3), R1 is selected from aromatic radicals, heteroaromatic radicals, and combinations thereof that absorb light in the wavelength range from 200 nm to 650 nm and that are unsubstituted or substituted one or more times by at least one monovalent group selected from C1-C18 alkyl, C2-C18 alkenyl, C2-C18 alkynyl, C1-C18 haloalkyl, —NO2, —NR10 R11, —CN, —OR12, —SR12, —C(O)R13, —C(O)OR14, halogen, groups of the formula N(R7)(R6)-CH(R5)-N(R4)-C(R2)(R3)-where R2-R7 are as defined below, and combinations thereof, and that upon absorption of light in the wavelength range from 200 nm to 650 nm bring a photoelimination that generates an amidine or guanidine. R2 and R3 are each independently selected from hydrogen, C1-C18 alkyl, phenyl, substituted phenyl (that is, substituted one or more times by at least one monovalent group selected from C1-C18 alkyl, —CN, —OR12, —SR12, halogen, C1-C18 haloalkyl, and combinations thereof), and combinations thereof; R5 is selected from C1-C8 alkyl, —NR8 R9, and combinations thereof; R4, R6, R7, R8, R9, R10 and R11 are each independently selected from hydrogen, C1-C18 alkyl, and combinations thereof; or R4 and R6 together form a C2-C12 alkylene bridge that is unsubstituted or is substituted by one or more monovalent groups selected from C1-C4 alkyl radicals and combinations thereof; or R5 and R7, independently of R4 and R6, together form a C2-C12 alkylene bridge that is unsubstituted or is substituted by one or more monovalent groups selected from C1-C4 alkyl radicals and combinations thereof; or, if R5 is —NR8R9, then R7 and R9 together form a C2-C12 alkylene bridge that is unsubstituted or is substituted by one or more monovalent groups selected from C1-C4 alkyl radicals and combinations thereof; R12 and R13 are each independently selected from hydrogen, C1-C19 alkyl, and combinations thereof; and R14 is selected from C1-C19 alkyl and combinations thereof. The alkyl and haloalkyl groups can be linear or branched and, in some embodiments, contain 1 to 12 carbon atoms (in some embodiments, 1 to 6 carbon atoms). In some embodiments, halogen atoms are chlorine, fluorine, and/or bromine (in some embodiments, chlorine and/or fluorine). The alkenyl groups can be linear or branched and, in some embodiments, contain 2 to 12 carbon atoms (in some embodiments, 2 to 6 carbon atoms). The alkynyl groups can be linear or branched and, in some embodiments, contain 2 to 12 carbon atoms (in some embodiments, 2 to 6 carbon atoms).

In some embodiments of formula N(R7)(R6)-CH(R5)-N(R4)-C(R1)(R2)(R3), R1 is selected from substituted and unsubstituted phenyl, naphthyl, phenanthryl, anthryl, pyrenyl, 5,6,7,8-tetrahydro-2-naphthyl, 5,6,7,8-tetrahydro-1-naphthyl, thienyl, benzo[b]thienyl, naphtho[2,3-b]thienyl, thianthrenyl, anthraquinonyl, dibenzofuryl, chromenyl, xanthenyl, thioxanthyl, phenoxathiinyl, pyrrolyl, imidazolyl, pyrazolyl, pyrazinyl, pyrimidinyl, pyridazinyl, indolizinyl, isoindolyl, indolyl, indazolyl, purinyl, quinolizinyl, isoquinolyl, quinolyl, phthalazinyl, naphthyridinyl, quinoxalinyl, quinazolinyl, cinnolinyl, pteridinyl, carbazolyl, β-carbolinyl, phenanthridinyl, acridinyl, perimidinyl, phenanthrolinyl, phenazinyl, isothiazolyl, phenothiazinyl, isoxazolyl, furazanyl, terphenyl, stilbenyl, fluorenyl, phenoxazinyl, and combinations thereof, any of these being unsubstituted or substituted one or more times by C1-C18 alkyl, C2-C18 alkenyl, C2-C18 alkynyl, C1-C18 haloalkyl, —NO₂, —NR10 R11, —CN, —OR12, —SR12, —C(O)R13, —C(O)OR14, halogen, a radical of the formula N(R7)(R6)-CH(R5)-N(R4)-C(R2)(R3)-, or a combination thereof, where R2-R7 and R10-R14 are as defined above. In some embodiments of formula N(R7)(R6)-CH(R5)-N(R4)–C(R1)(R2)(R3), R1 is a substituted or unsubstituted biphenylyl radical, wherein each phenyl group is independently substituted with from zero to three (preferably, zero or one) substituents selected from C1-C18 alkyl, C2-C18 alkenyl, —OH, —CN, —OR10, —SR10, halogen, radicals of the formula N(R7)(R6)-CH(R5)-N(R4)-C(R2)(R3)-, and combinations thereof, where R2-R7 and R10-R14 are as defined above. In some embodiments of formula N(R7)(R6)-CH(R5)-N(R4)-C(R1)(R2)(R3), R1 is selected from phenyl, 3-methoxyphenyl, 4-methoxyphenyl, 2,4,6-trimethoxyphenyl, 2,4-dimethoxyphenyl, and combinations thereof.

In some embodiments of formula N(R7)(R6)-CH(R5)-N(R4)-C(R1)(R2)(R3), R2 and R3 each are independently selected from hydrogen, C1-C6 alkyl, and combinations thereof (in some embodiments, both are hydrogen); R4 and R6 together form a C2-C6 alkylene (in some embodiments, C3 alkylene) bridge that is unsubstituted or is substituted by one or more groups selected from C1-C4 alkyl radicals and combinations thereof; and/or R5 and R7 together form a C2-C6 alkylene (in some embodiments, C3 or C5 alkylene) bridge that is unsubstituted or is substituted by one or more groups selected from C1-C4 alkyl radicals and combinations thereof, or, if R5 is —NR8 R9, R9 and R7 together form a C2-C6 alkylene bridge that is unsubstituted or substituted by one or more groups selected from C1-C4 alkyl radicals and combinations thereof.

Further examples of photolatent bases include 5-benzyl-1,5-diazabicyclo[4.3.0]nonane, 5-(anthracen-9-yl-methyl)-1,5-diaza[4.3.0]nonane, 5-(2'-nitrobenzyl)-1,5-diazabicyclo[4.3.0]nonane, 5-(4'-cyanobenzyl)-1,5-diazabicyclo[4.3.0]nonane, 5-(3'-cyanobenzyl)-1,5-diazabicyclo[4.3.0]nonane, 5-(anthraquinon-2-yl-methyl)-1,5-diaza[4.3.0]nonane, 5-(2'-chlorobenzyl)-1,5-diazabicyclo[4.3.0]nonane, 5-(4'-methylbenzyl)-1,5-diazabicyclo[4.3.0]nonane, 5-(2',4',6'-trimethylbenzyl)-1,5-diazabicyclo[4.3.0]nonane, 5-(4'-ethenylbenzyl)-1,5-diazabicyclo[4.3.0]nonane, 5-(3'-trimethylbenzyl)-1,5-diazabicyclo[4.3.0]nonane, 5-(2',3'-dichlorobenzyl)-1,5-diazabicyclo[4.3.0]nonane, 5-(naphth-2-yl-methyl-1,5-diazabicyclo[4.3.0]nonane, 1,4-bis(1,5-diazabicyclo[4.3.0]nonanylmethyl)benzene, 8-benzyl-1,8-diazabicyclo[5.4.0]undecane, 8-benzyl-6-methyl-1,8-diazabicyclo[5.4.0]undecane, 9-benzyl-1,9-diazabicyclo[6.4.0]dodecane, 10-benzyl-8-methyl-1,10-diazabicyclo[7.4.0]tridecane, 11-benzyl-1,11-diazabicyclo[8.4.0]tetradecane, 8-(2'-chlorobenzyl)-1,8-diazabicyclo[5.4.0]undecane, 8-(2',6'-dichlorobenzyl)-1,8-diazabicyclo[5.4.0]undecane, 4-(diazabicyclo[4.3.0]nonanylmethyl)-1,1'-biphenyl, 4,4'-bis(diazabicyclo[4.3.0]nonanylmethyl)-11'-biphenyl, 5-benzyl-2-methyl-1, 5-diazabicyclo[4.3.0]nonane, 5-benzyl-7-methyl-1,5,7-triazabicyclo[4.4.0]decane, and combinations thereof. Such compounds can be made, for example, using the methods described in U.S. Pat. No. 7,538,104 (Baudin et al.), assigned to BASF, Ludwigshafen, Germany.

Further examples of photolatent bases include those described in U.S. Pat. No. 6,410,628 (Hall-Goulle et al.), U.S. Pat. No. 6,087,070 (Turner et al.), U.S. Pat. No. 6,124,371 (Stanssens et al.), and U.S. Pat. No. 6,057,380 (Birbaum et al.), and U.S. Pat. Appl. Pub. No. 2011/0190412 (Studer et al.).

In some embodiments, the photolatent base is part of the first component containing the polysulfide, polythioether, or copolymer thereof. The photolatent base can be any suitable proportion of the overall sealant composition, such as in the range of from 0.1 wt % to 10 wt %, 1 wt % to 7 wt %, 0.5 wt % to 5 wt %, or 2 to 5 wt %; or in some embodiments less than, equal to, or greater than 0.01 wt %, 0.05, 0.1, 0.5, 1, 1.5, 2, 2.5, 3, 3.5, 4, 4.5, 5, 5.5, 6, 6.5, 7, 7.5, 8, 8.5, 9, 9.5, or 10 wt %, based on the overall weight of the sealant composition.

The second amine and its amount may be selected to provide the composition with a desirable amount of open time (that is, the length of time it takes for the composition to become at least partially gelled) after it is mixed or thawed. In some embodiments, the composition has an open time of at least 10 minutes, at least 30 minutes, at least one hour, or at least two hours. The amount of the second amine and its conjugate acid pKa both affect the open time.

A composition with a smaller amount of a second amine having a higher pKa may have the same open time as a composition having a larger amount of a second amine having a lower pKa. For example, a second amine having a moderate conjugate acid pKa value in a range from 7 to 10 can be present in an amount of from 0.05 wt % to 10 wt %, 0.1 wt % to 7.5 wt %, 1 wt % to 5 wt %; or in some embodiments less than, equal to, or greater than 0.001 wt %, 0.005, 0.01, 0.05, 0.1, 0.2, 0.3, 0.4, 0.5, 0.6, 0.7, 0.8, 0.9, 1, 1.5, 2, 2.5, 3, 4, 5, 6, 7, 8, 9 or 10 wt %, relative to the overall weight of the sealant composition. A second amine having a higher conjugate acid pKa value of 11 can be present in an amount of from 0.005 wt % to 3 wt %, 0.05 wt % to 2 wt %; or in some embodiments less than, equal to, or greater than 0.001 wt %, 0.002, 0.005, 0.01, 0.2, 0.05, 0.1, 0.2, 0.5, 0.6, 0.7, 0.8, 0.9, 1, 1.5, 2, 2.5, 3, 4, or 5 wt %, relative to the overall weight of the sealant composition.

In some embodiments in which the second amine is different from the first amine, the second amine has a lower conjugate acid pKa value than the first amine. This may be useful, for example, for achieving a desirable amount of open time and a desirably fast cure-on-demand. In some embodiments in which the second amine is different from the first amine, the first amine and the second amine have the same conjugate acid pKa value.

Useful photolatent bases can absorb light in a wavelength range from 200 nm to 650 nm. In various embodiments, the provided sealant compositions (which include the photolatent base) absorb light in the ultraviolet A (UVA) and/or blue light regions, for example, in a wavelength range from 315 nm to 550 nm or 315 nm to 500 nm. UVA light can be considered to have a wavelength range of 315 nm to 400 nm, and blue light can be considered to have a wavelength range of 450 nm to 495 nm.

Optionally, the first or second component further includes a third amine. In various embodiments, the second amine is phase-separated and the third amine is not phase-separated. The third amine can be the same or different from the first and/or second amine. Advantageously, the third amine can provide the composition with a backup curing mechanism at ambient temperature and facilitate curing where irradiation with actinic radiation is omitted or incomplete. As such, the backup curing mechanism can significantly reduce technique sensitivity in the use of the provided sealant compositions.

Photosensitizers

In some embodiments, the first or second component of the provided sealant compositions further includes at least one photosensitizer. A photosensitizer can be useful, for example, if the photolatent base does not have a strong absorbance in a wavelength range that is desired for curing the composition. As used herein, a photosensitizer is a compound having an absorption spectrum that overlaps or closely matches the emission spectrum of the radiation source to be used and that can improve the overall quantum yield by means of, for example, energy transfer or electron transfer to other component(s) of the composition (e.g., the photolatent base).

Useful photosensitizers include aromatic ketones (e.g., substituted or unsubstituted benzophenones, substituted or unsubstituted thioxanthones, substituted or unsubstituted anthraquinones, and combinations thereof), dyes (e.g., oxazines, acridines, phenazines, rhodamines, and combinations thereof), 3-acylcoumarins (e.g., substituted and unsubstituted 3-benzoylcoumarins and substituted and unsubstituted 3-naphthoylcoumarins, and combinations thereof), anthracenes (e.g., substituted and unsubstituted anthracenes), 3-(2-benzothiazolyl)-7-(diethylamino)coumarin (coumarin 6), 10-acetyl-2,3,6,7-tetrahydro-1H,5H,11H-[1]benzopyrano[6,7,8-ij]quinolizin-11-one (coumarin 521), other carbonyl compounds (e.g., camphorquinone, 4-phenylacetophenone, benzil, and xanthone, and combinations thereof), and combinations thereof. In some embodiments, the photosensitizer has an absorbance in the blue light range. In a preferred embodiment, the photosensitizer is camphorquinone.

The amount of photosensitizer can vary widely, depending upon, for example, its nature, the nature of other constituents of the sealant composition, and the particular curing conditions. In some embodiments, the photosensitizer is present in the first or second component in an amount of from 0.1 wt % to 10 wt %; 0.25 wt % to 5 wt %; 0.5 wt % to 3 wt %; or in some embodiments less than, equal to, or greater than 0.01 wt %, 0.05, 0.1, 0.2, 0.5, 1, 1.5, 2, 2.5, 3, 4, 5, 7, 8, 9, 10, 11, or 12 wt %, relative to the overall weight of the sealant composition.

Other Additives

The provided sealant compositions optionally contain fillers. Conventional inorganic fillers such as silica (e.g., fumed silica), calcium carbonate, aluminum silicate, hollow ceramic elements, hollow polymeric elements, talc, calcium silicates, and carbon black may be useful as well as low density fillers. Optionally, the sealant composition can contain a flame retardant filler such as aluminum trihydroxide.

Silica fillers can be of any desired size, including particles having an average size above 1 micrometer, between 100 nanometers and 1 micrometer, and below 100 nanometers. Silica can include nanosilica and amorphous fumed silica, for example. Suitable low density fillers may have a specific gravity ranging from 1.0 to 2.2 and are exemplified by calcium silicates, fumed silica, precipitated silica, and polyethylene. Examples include calcium silicate having a specific gravity of from 2.1 to 2.2 and a particle size of from 3 to 4 microns ("HUBERSORB HS-600", J. M. Huber Corp.) and fumed silica having a specific gravity of 1.7 to 1.8 with a particle size less than 1 ("CAB-O-5Th TS-720", Cabot Corp.). Other examples include precipitated silica having a specific gravity of from 2 to 2.1 ("HI-SIL TS-7000", PPG Industries), and polyethylene having a specific gravity of from 1 to 1.1 and a particle size of from 10 to 20 microns ("SHAMROCK S-395" Shamrock Technologies Inc.).

The term "ceramic" refers to glasses, crystalline ceramics, glass-ceramics, and combinations thereof. Hollow ceramic elements can include hollow spheres and spheroids. The hollow ceramic elements and hollow polymeric elements may have one of a variety of useful sizes but typically have a maximum dimension of less than 500 micrometers, more typically less than 100 micrometers. The specific gravities of the microspheres range from 0.1 to 0.7 and are exemplified by polystyrene foam, microspheres of polyacrylates and polyolefins, and silica microspheres having particle sizes ranging from 5 to 100 microns and a specific gravity of 0.25 ("ECCOSPHERES", W. R. Grace & Co.). Other examples include elastomeric particles available, for example, from Akzo Nobel, Amsterdam, The Netherlands, under the trade designation "EXPANCEL."

Further examples include alumina/silica microspheres having particle sizes in the range of 5 to 300 microns and a specific gravity of 0.7 ("FILLITE", Pluess-Stauffer International), aluminum silicate microspheres having a specific gravity of from 0.45 to 0.7 ("Z-LIGHT"), and calcium carbonate-coated polyvinylidene copolymer microspheres having a specific gravity of 0.13 ("DUALITE 6001AE", Pierce & Stevens Corp.). Further examples of commercially available materials suitable for use as hollow, ceramic elements include glass bubbles marketed by 3M Company, Saint Paul, Minn., as "3M GLASS BUBBLES" in grades K1, K15, K20, K25, K37, K46, S15, S22, S32, S35, S38, S38HS, S38XHS, S42HS, S42XHS, S60, S60HS, iM30K, iM16K, XLD3000, XLD6000, and G-65, and any of the HGS series of "3M GLASS BUBBLES"; glass bubbles marketed by Potters Industries, Carlstadt, N.J., under the trade designations "Q-CEL HOLLOW SPHERES" (e.g., grades 30, 6014, 6019, 6028, 6036, 6042, 6048, 5019, 5023, and 5028); and hollow glass particles marketed by Silbrico Corp., Hodgkins, Ill. under the trade designation "SIL-CELL" (e.g., grades SIL 35/34, SIL-32, SIL-42, and SIL-43).

Additional suitable filler materials are described, for example, in co-pending U.S. Patent Application Ser. No. 62/397,428 (Karp, et al.).

The aforementioned fillers, alone or in combination, can be present in an amount of from 10 wt % to 55 wt %; 20 wt % to 50 wt %; or in some embodiments less than, equal to, or greater than 5 wt %, 8, 10, 12, 15, 17, 20, 25, 30, 35, 40, 45, 50, 55, 60, 65, or 70 wt %, based on the total weight of the sealant composition.

The first and/or second component of the provided compositions can also contain any of a number of known cure accelerators, surfactants, adhesion promoters, thixotropic agents, pigments, solvents, and plasticizers. Known adhesion promoters, for example, include 3-glycidoxypropyltrialkoxysilane, 3-acryloxypropyltrialkoxysilane, 3-aminopropyltrialkoxysilane, vinyltrialkoxysilane, N-aminoethyl-3-aminopropylmethyldialkoxysilane, phenylaminopropyltrialkoxysilane, aminoalkyltrialkoxydisilane, and i-butylmethoxysilane. In some embodiments, the alkoxy groups are independently methoxy or ethoxy groups.

The solvent, if used, can be any material (e.g., N-methyl-2-pyrrolidone, tetrahydrofuran, ethyl acetate, or those described below) capable of dissolving the photolatent base or another component of the composition.

Colorants

In the provided sealant compositions, either or both of the first or second component further contains a colorant. The colorant serves to impart a color to the respective component of sealant composition. In certain cure-on-demand polysulfide sealants, photocuring of a tack-free skin can have tendency to impart a red or pink color to the sealant which can persist after the sealant is fully cured. This is problematic for Class B sealants, because industry specifications do not allow Class B sealants to have a red or pink color, which designate other sealant classes.

Advantageously, the color imparted to the first or second component can be prominent to the naked eye, making it suitable for use as a mixing indicator. The color can be retained, albeit to a lesser degree, when the first and second components are mixed with each other and the sealant composition is partially or fully cured.

The colorant can be a pigment or a dye. Pigments are generally insoluble in, or immiscible with, in the remaining constituents of the first or second component in which it is dispersed. Dyes are generally soluble in, or miscible with, the remaining constituents of the first or second component in which it is dispersed. Pigments and dyes can be either solids or liquids at ambient conditions. It can be advantageous for the colorant to be insoluble in both water and organic media, so that leaching of the colorant is minimal when the cured sealant is placed in extended contact with jet fuel or wash water.

In various embodiments, the colorant is not a photoinitiator, photolatent base, or photosensitizer used in the curing reaction. While these compounds can provide color to one or both components, they also tend to absorb light over wavelengths used to cure the sealant composition, thereby reducing the depth of cure.

Potentially useful colorants include copper sulfate pentahydrate, iron(III) hexacyanoferrate(II), Cinquasia Violet K 5350 FP, Ultramarine Blue, Solvent Blue 35, and combinations thereof.

In some embodiments, the colorant is present in the first or second component in an amount sufficient to mask any color in the sealant composition arising out of the photocuring process. Since the cure-on-demand sealant compositions described herein tend to have relatively little color on their own, it can be advantageous for the colorant to provide a significant color contrast between the first and second component; that is, a user can easily distinguish between a component that contains the colorant and one that either does not contain the colorant or contains a significantly lesser amount of the colorant.

The colorant can be any suitable proportion of the first or second component, such as from 0.01 wt % to 10 wt %, 0.1 wt % to 8 wt %, or 1 to 6 wt %, or in some embodiments 0.005 wt % or less; less than, equal to, or greater than 0.01 wt %, 0.05, 0.1, 0.5, 1, 1.5, 2, 2.5, 3, 3.5, 4, 4.5, 5, 5.5, 6, 6.5, 7, 7.5, 8, 8.5, 9, 9.5, or 10 wt %, based on the overall weight of the respective first or second component.

More broadly, the colorant can be any suitable proportion of the overall sealant composition, such as from 0.001 wt % to 5 wt %, 0.01 wt % to 4 wt %, or 0.1 wt % to 3 wt %, or in some embodiments less than, equal to, or greater than 0.001 wt %, 0.005, 0.01, 0.05, 0.1, 0.5, 1, 1.5, 2, 2.5, 3, 3.5, 4, 4.5, 5, 5.5, 6, 6.5, 7, 7.5, 8, 8.5, 9, 9.5, or 10 wt %, based on the overall weight of the sealant composition.

In the simplest case, only a single colorant is present and that colorant is only in one of the first and second components of the sealant composition. In some instances, however, two or more different colorants can be used. For example, the first or second component can contain a blend of two different colorants that collectively function as a single colorant having characteristics described herein. Alternatively, the first and second components can each contain some amount of a respective colorant, where the colorant in the first component is different from the colorant in the second component. As another possibility, both the first and second components can contain the same colorant, but in different amounts.

The colorant(s) can be present in sufficient concentrations where needed to mask the natural color of oxidizing agents in the sealant composition, such as manganese dioxide. In instances where there is little or no colored oxidizing agents are in the sealant composition, the colorant should still be present in an amount sufficient to provide contrast between the first and second components. In these embodiments, the sealant composition can contain less than 5 wt %, 4, 3, 2, or 1 wt % of colored oxidizing agents, or can be essentially free of colored oxidizing agents.

With respect to the actinic radiation used to cure the sealant composition, the colorant can have a molar extinction coefficient that allows for a sufficient depth of cure for a cure-on-demand sealant application. A sufficient depth of cure can, for example, provide a tack-free surface "skin," whereby a user can touch the sealant composition after irradiation without smearing or otherwise marring its surface.

The molar extinction coefficient of the dispersed colorant with respect to monochromatic light at a wavelength of 450 nm can be in the range of from 0 $M^{-1}cm^{-1}$ to 20,000 $M^{-1}cm^{-1}$, 100 $M^{-1}cm^{-1}$ to 10,000 $M^{-1}cm^{-1}$, or 200 $M^{-1}cm^{-1}$ to 3000 $M^{-1}cm^{-1}$; or in some embodiments less than, equal to, or greater than 5 $M^{-1}cm^{-1}$, 10, 20, 30, 50, 70, 100, 200, 300, 450, 500, 600, 800, 1000, 1500, 2000, 5000, 7000, 10,000, 12,000, 15,000, 17,000, or 20,000 $M^{-1}cm^{-1}$ when disposed in its respective component.

To further enhance the depth of cure, the colorant can substantially reflect or substantially transmit the light (or actinic radiation) used to initiate cure of the sealant composition. For example, the colorant can substantially reflect or substantially transmit light over the wavelength range from 350 nm to 500 nm, from 370 nm to 480 nm, from 400 nm to 470 nm; or in some embodiments over wavelengths less than, equal to, or greater than 350 nm, 360, 370, 380, 390, 400, 410, 420, 430, 440, 450, 460, 470, 480, 490, 500, or 510 nm. As used herein, the term "substantially" can refer to least about 75%, 80, 90, 95, 96, 97, 98, 99, 99.5, 99.9, 99.99, or at least about 99.999, or 100% of the intensity of incident light.

The depth of cure achieved when photocuring the provided sealant compositions can be sufficient to form a tack-free skin on the surface of the mixed sealant composition. A suitable non-tacky surface may be, for example, one in which the surface no longer tightly adheres to L-LP-690 standard low density polyethylene film. Advantageously, use of a colorant that does not substantially absorb or reflect light over wavelengths ranging from 350 nm to 500 nm can provide a sealant composition having a sufficiently high depth of cure. For example, when using a curing light having a primary wavelength of 450 nm, the depth of cure can be equal to or greater than 0.5 mm, 0.6, 0.7, 0.8, 0.9, 1, 1.1, 1.2, 1.3, 1.4, 1.5, 1.6, 1.7, 1.8, 1.9, or 2 mm when disposed in its respective component.

Notably, the provided sealant compositions and related methods solve a technical dilemma faced in developing a photocured sealant. For a colorant to serve as a mixing indicator, it generally needs to be intrinsically dark or present in sufficient quantities to provide visual contrast. This need is amplified when the photocuring reaction itself introduces an undesirable color to the sealant, as described above. Yet, use of a dark colorant or a colorant in high concentrations can cause significant absorption of actinic radiation and prevent thick layers of sealant from being properly cured. This dilemma is answered by the provided two-part sealant compositions, which combine both a chemical cure and a photocure aspect to allow even very thick layers of sealant to be fully cured, provide a strong color contrast to show mixing of the components, and also does not interfere with the formation of a tack-free skin layer when photocured.

Mixed Compositions

In various embodiments, the present invention provides a mixed composition. The mixed composition includes the first component and the second component of any embodiment of the sealant composition described herein. The first component and the second component can be mixed, such as substantially homogeneously mixed. In various embodiments, the mixed composition provides a class B sealant.

Kits

In various embodiments, the present invention provides a kit. The kit can include the first component and the second component of any embodiment of the sealant composition described herein. In the kit, the first component and the second component can be separate (e.g., unmixed).

Methods of Use

In various embodiments, the present invention provides a method of making a cured product of the sealant composition. The method can include mixing the first component and the second component of any embodiment of the sealant composition described herein to form a mixed composition. The method can also include curing the mixed composition with actinic radiation, such as visible light, to form the cured product of the sealant composition.

One method of curing a sealant composition includes providing a sealant composition in which the second component contains an ethylenically-unsaturated compound and either of the first or second component contains a photoinitiator; mixing the first and second components with each other; and at least one of: exposing the photoinitiator to visible light to initiate curing of the sealant composition; or allowing the mixed composition to at least partially cure over time under ambient conditions.

Another method of curing a sealant composition includes providing a sealant composition in which the second component contains a polyepoxide and either the first or second component contains a photolatent base and/or photosensitizer; mixing the first and second components with each other; and at least one of: exposing the photolatent base and photosensitizer to visible light to initiate curing of the sealant composition; or allowing the mixed composition to at least partially cure over time under ambient conditions.

Where visible light is used in the curing of the sealant compositions, the visible light can have any suitable wavelength and can be emitted from any suitable curing light source. In some embodiments, a light source having a monomodal wavelength distribution is used. Such light sources include LED light sources. While not particularly restricted, the visible light can have primary wavelength in the range of, for example, 400 nm to 700 nm, 420 nm to 650 nm, or 450 nm to 550 nm; or less than, equal to, or greater than 400 nm, 420, 450, 470, 500, 525, 550, 575, 600, 625, 650, 675, or 700 nm. The primary wavelength, as used herein, represents the wavelength at which the maximum light intensity is observed.

Suitable light sources are not limited to lamps that emit only visible light. For example, curing light sources can include broad spectrum UV-emitting mercury lamps outfitted with, for example, electrodeless "D"-type or "H"-type bulbs provided by Heraeus Noblelight America, Gaithersburg, Md. These curing light sources can be multi-modal, but also effective in achieving an efficient cure of the provided sealant compositions.

In various embodiments, the present invention provides a method of sealing a surface. The method can include mixing the first component and the second component of any embodiment of the sealant composition described herein to form a mixed composition. The method can include applying the mixed composition to the surface to be sealed. The mixing can occur before the applying, during the applying, or a combination thereof. The method can include curing the mixed composition on the surface to be sealed to form a cured product of the sealant composition (e.g., a cured product of the mixed composition) on the surface, to form a sealed surface.

Various non-limiting embodiments are enumerated below, which are not intended to be exhaustive:

1. A sealant composition comprising: a first component comprising a polysulfide, a polythioether, or a copolymer or combination thereof containing pendant or terminal thiol groups; and a second component comprising an ethylenically-unsaturated compound, wherein the first or second component further comprises: a photoinitiator; and a colorant that substantially reflects or substantially transmits light over the wavelength range from 350 nm to 500 nm.

2. The sealant composition of embodiment 1, wherein the second component further comprises a peroxide.

3. The sealant composition of embodiment 2, wherein the peroxide is heat-activated.

4. The sealant composition of embodiment 2 or 3, wherein the peroxide comprises a hydroperoxide.

5. The sealant composition of any one of embodiments 2-4, wherein the second component further comprises an amine, wherein the peroxide and amine collectively provide a redox initiator.

6. The sealant composition of any one of embodiments 1-5, wherein the ethylenically-unsaturated compound comprises more than one carbon-carbon double bond or a carbon-carbon triple bond.

7. The sealant composition of embodiment 6, wherein the ethylenically-unsaturated compound comprises at least one of triallyl-1,3,5-triazine-2,4,6-trione, 2,4,6-triallyloxy-1,3,5-triazine, 4-vinyl-1-cyclohexene, 1,5-cyclooctadiene, 1,6-heptadiyne, 1,7-octadiyne, diallyl phthalate, Bisphenol A diallyl ether, allylpentaerythritol, and trimethylolpropane diallyl ether.

8. The sealant composition of any one of embodiments 1-7, wherein the photoinitiator is a free-radical photoinitiator that is activated by an actinic light source.

9. The sealant composition of embodiment 8, wherein the free-radical photoinitiator comprises at least one of a benzoin ether; substituted acetophenone (e.g., 2,2-dimethoxy-2-phenylacetophenone or 2,2-diethoxyacetophenone); 1-hydroxycyclohexyl phenyl ketone; acylphosphonate derivative, diphenyl-2,4,6-trimethylbenzoylphosphine oxide, isopropoxyphenyl-2,4,6-trimethylbenzoylphosphine oxide, and dimethyl pivaloylphosphonate.

10. The sealant composition of any one of embodiments 1-9, wherein the ethylenically-unsaturated compound is present in an amount of from 10 wt % to 100 wt % relative to the overall weight of the second component.

11. The sealant composition of embodiment 10, wherein the ethylenically-unsaturated compound is present in an amount of from 30 wt % to 80 wt % relative to the overall weight of the second component.

12. The sealant composition of embodiment 11, wherein the ethylenically-unsaturated compound is present in an amount of from 50 wt % to 70 wt % relative to the overall weight of the second component.

13. The sealant composition of any one of embodiments 1-12, wherein the photoinitiator is present in an amount of from 0.01 wt % to 10 wt % relative to the overall weight of the sealant composition.

14. The sealant composition of embodiment 13, wherein the photoinitiator is present in an amount of from 0.1 wt % to 7 wt % relative to the overall weight of the sealant composition.

15. The sealant composition of embodiment 14, wherein the photoinitiator is present in an amount of from 0.5 wt % to 3 wt % relative to the overall weight of the sealant composition.

16. The sealant composition of any one of embodiments 2-15, wherein the peroxide is present in an amount of from 0.1 wt % to 10 wt % relative to the overall weight of the sealant composition.

17. The sealant composition of embodiment 16, wherein the peroxide is present in an amount of from 0.25 wt % to 5 wt % relative to the overall weight of the sealant composition.

18. The sealant composition of embodiment 17, wherein the peroxide is present in an amount of from 0.5 wt % to 3 wt % relative to the overall weight of the sealant composition.

19. The sealant composition of any one of embodiments 1-18, wherein the first or second component further comprises an inorganic filler selected from one or more of: silica, carbon black, calcium carbonate, aluminum silicate, talc, and aluminum trihydroxide.

20. The sealant composition of any one of embodiments 1-19, wherein the first or second component further comprises one or more of: a surfactant, adhesion promoter, thixotropic agent, and solvent.

21. A sealant composition comprising: a first component comprising a polysulfide, a polythioether, or a copolymer or combination thereof containing pendant or terminal thiol groups; and a second component comprising a polyepoxide, wherein the first or second component further comprises a photolatent base, a photosensitizer and a colorant that substantially reflects or substantially transmits light over the wavelength range from 350 nm to 500 nm.

22. The sealant composition of embodiment 21, wherein the photolatent base is capable of photochemically generating a first amine.

23. The sealant composition of embodiment 22, wherein the first component further comprises a second amine.

24. The sealant composition of embodiment 23, wherein the second amine is phase-separated within the composition and the first component further comprises a third amine that is not phase-separated within the composition.

25. The sealant composition of embodiment 23 or 24, wherein the first amine has a higher conjugate acid pKa than the conjugate acid pKa of the second amine.

26. The sealant composition of any one of embodiments 23-25, wherein each of the first amine and second amine is independently a tertiary amine or a guanidine.

27. The sealant composition of embodiment 26, wherein the tertiary amine is an amidine.

28. The sealant composition of any one of embodiments 23-27 wherein at least one of the first amine or second amine comprises at least one of triethylamine, dimethylethanolamine, benzyldimethylamine, dimethylaniline, tribenzylamine, triphenylamine, tetramethylguanidine, 1,8-diazabicyclo[5.4.0]undec-7-ene, 1,5-diazabicyclo[4.3.0]non-5-ene, 1,4-diazabicyclo[2.2.2]octane, diphenylguanidine, dimethylaminomethyl phenol, and tris(dimethylaminomethyl)phenol.

29. The sealant composition of any one of embodiments 21-28, wherein the photosensitizer comprises camphorquinone.

30. The sealant composition of any one of embodiments 21-29, wherein the photosensitizer is present in an amount of from 0.1 wt % to 10 wt % based on the overall weight of the sealant composition.

31. The sealant composition of embodiment 30, wherein the photosensitizer is present in an amount of from 0.25 wt % to 5 wt % based on the overall weight of the sealant composition.

32. The sealant composition of embodiment 31, wherein the photosensitizer is present in an amount of from 0.5 wt % to 3 wt % based on the overall weight of the sealant composition.

33. The sealant composition of any one of embodiments 21-32, wherein the polyepoxide is monomeric.

34. The sealant composition of any one of embodiments 21-32, wherein the polyepoxide is oligomeric or polymeric.

35. The sealant composition of any one of embodiments 21-34, wherein the polyepoxide is aromatic.

36. The sealant composition of any one of embodiments 21-34, wherein the polyepoxide is aliphatic.

37. The sealant composition of any one of embodiments 21-36, wherein the polyepoxide comprises three or more epoxide groups.

38. The sealant composition of any one of embodiments 21-37, wherein the polyepoxide is present in an amount of from 10 wt % to 90 wt % relative to the overall weight of the second component.

39. The sealant composition of embodiment 38, wherein the polyepoxide is present in an amount of from 20 wt % to 80 wt % relative to the overall weight of the second component.

40. The sealant composition of embodiment 39, wherein the polyepoxide is present in an amount of from 30 wt % to 70 wt % relative to the overall weight of the second component.

41. The sealant composition of any one of embodiments 21-40, wherein the second amine is present in the first component in an amount of from 0.1 wt % to 10 wt % relative to the overall weight of the sealant composition.

42. The sealant composition of embodiment 41, wherein the second amine is present in the first component in an amount of from 0.3 wt % to 7 wt % relative to the overall weight of the sealant composition.

43. The sealant composition of embodiment 42, wherein the second amine is present in the first component in an amount of from 0.5 wt % to 4 wt % relative to the overall weight of the sealant composition.

44. The sealant composition of any one of embodiments 21-43, wherein the photolatent base is present in the first component in an amount of from 0.1 wt % to 10 wt % relative to the overall weight of the sealant composition.

45. The sealant composition of embodiment 44, wherein the photolatent base is present in the first component in an amount of from 1 wt % to 7 wt % relative to the overall weight of the sealant composition.

46. The sealant composition of embodiment 45, wherein the photolatent base is present in the first component in an amount of from 2 wt % to 5 wt % relative to the overall weight of the sealant composition.

47. The sealant composition of any one of embodiments 1-46, wherein the colorant substantially reflects or transmits light over the wavelength range from 370 nm to 480 nm.
48. The sealant composition of embodiment 47, wherein the colorant substantially reflects or transmits light over the wavelength range from 400 nm to 470 nm.
49. The sealant composition of any one of embodiments 1-48, wherein the colorant comprises a pigment.
50. The sealant composition of embodiment 49, wherein the colorant is selected from iron(III) hexacyanoferrate (II), Cinquasia Violet K 5350 FP, Indanthrone Blue, Ultramarine Blue, and combinations thereof.
51. The sealant composition of any one of embodiments 1-50, wherein the colorant is present in an amount sufficient to provide visual contrast between the first and second components.
52. The sealant composition of any one of embodiments 1-51, wherein the colorant displays a molar extinction coefficient with respect to monochromatic light at a wavelength of 450 nm of from 0 $M^{-1}cm^{-1}$ to 20,000 $M^{-1}cm^{-1}$ in its respective component.
53. The sealant composition of embodiment 52, wherein the colorant displays a molar extinction coefficient with respect to monochromatic light at a wavelength of 450 nm of from 100 $M^{-1}cm^{-1}$ to 10,000 $M^{-1}cm^{-1}$ in its respective component.
54. The sealant composition of embodiment 53, wherein the colorant displays a molar extinction coefficient with respect to monochromatic light at a wavelength of 450 nm of from 200 $M^{-1}cm^{-1}$ to 3000 $M^{-1}cm^{-1}$ in its respective component.
55. The sealant composition of any one of embodiments 1-54, wherein the colorant is present in an amount of from 0.01 wt % to 10 wt % based on the overall weight of its respective component.
56. The sealant composition of embodiment 55, wherein the colorant is present in an amount of from 0.1 wt % to 8 wt % based on the overall weight of its respective component.
57. The sealant composition of embodiment 56, wherein the colorant is present in an amount of from 1 wt % to 6 wt % based on the overall weight of its respective component.
58. The sealant composition of any one of embodiments 1-57, wherein the first component comprises a polysulfide.
59. The sealant composition of any one of embodiments 1-57, wherein the first component comprises a polythioether.
60. The sealant composition of any one of embodiments 1-59, wherein the weight ratio of the first component to the second component is from 0.1:1 to 50:1.
61. The sealant composition of embodiment 60, wherein the weight ratio of the first component to the second component is from 0.5:1 to 30:1.
62. The sealant composition of embodiment 61, wherein the weight ratio of the first component to the second component is from 1:1 to 15:1.
63. The sealant composition of any one of embodiments 1-62, wherein the first component is present in an amount of from 10 wt % to 95 wt % relative to the overall weight of the sealant composition.
64. The sealant composition of embodiment 63, wherein the first component is present in an amount of from 25 wt % to 85 wt % relative to the overall weight of the sealant composition.
65. The sealant composition of embodiment 64, wherein the first component is present in an amount of from 60 wt % to 80 wt % relative to the overall weight of the sealant composition.
66. The sealant composition of any one of embodiments 1-65, wherein the second component is present in an amount of from 1 wt % to 75 wt % relative to the overall weight of the sealant composition.
67. The sealant composition of embodiment 66, wherein the second component is present in an amount of from 5 wt % to 65 wt % relative to the overall weight of the sealant composition.
68. The sealant composition of embodiment 67, wherein the second component is present in an amount of from 10 wt % to 40 wt % relative to the overall weight of the sealant composition.
69. The sealant composition of any one of embodiments 1-68, wherein the polysulfide, a polythioether, or a copolymer or combination thereof containing pendant or terminal thiol groups has a number-average molecular weight of from 800 g/mol to 10,000 g/mol.
70. The sealant composition of any one of embodiments 1-69, wherein the sealant composition contains less than 5 wt % of one or more colored oxidizing agents.
71. The sealant composition of embodiment 70, wherein the sealant composition contains less than 1 wt % of one or more colored oxidizing agents.
72. The sealant composition of embodiment 71, wherein the sealant composition is essentially free of colored oxidizing agents.
73. The sealant composition of any one of embodiments 1-72, wherein the sealant composition reaches an effectively cured state from 15 minutes to 48 hours after mixing the first and second components under ambient conditions.
74. The sealant composition of embodiment 73, wherein the sealant composition reaches an effectively cured state from 30 minutes to 24 hours after mixing the first and second components under ambient conditions.
75. The sealant composition of embodiment 74, wherein the sealant composition reaches an effectively cured state from 1 hour to 12 hours after mixing the first and second components under ambient conditions.
76. A cured composition obtained by mixing the first and second component of any one of embodiments 1-75.
77. A method of curing a sealant composition, the method comprising: providing the sealant composition of any one of embodiments 1-20 and 47-75; mixing the first and second components with each other; and at least one of: exposing a photoinitiator present in the first or second component to visible light to initiate curing of the sealant composition; or allowing the mixed composition to at least partially cure over time under ambient conditions.
78. A method of curing a sealant composition, the method comprising: providing the sealant composition of any one of embodiments 21-75; mixing the first and second components with each other; and at least one of: exposing a photolatent base present in the first or second component to visible light to generate a first amine, whereby the first amine catalyzes curing of the sealant composition; or allowing the mixed composition to at least partially cure over time under ambient conditions.
79. The method of embodiment 77 or 78, wherein the visible light has a primary wavelength of from 400 nm to 700 nm.

80. The method of embodiment 79, wherein the visible light has a primary wavelength of from 420 nm to 650 nm.

81. The method of embodiment 80, wherein the visible light has a primary wavelength of from 450 nm to 550 nm.

82. The cured composition obtained using the method of any one of embodiments 77-81.

83. The cured composition of embodiment 76 or 82, wherein the sealant composition is a class B sealant.

EXAMPLES

Objects and advantages of this disclosure are further illustrated by the following non-limiting examples. Particular materials and amounts thereof recited in these examples, as well as other conditions and details, should not be construed to unduly limit this disclosure.

Unless otherwise noted, all reagents were obtained or are available from Sigma-Aldrich Company, St. Louis, Mo., or may be synthesized by known methods. Unless otherwise reported, all ratios are by weight percent.

The Following Abbreviations are Used to Describe the Examples:
° C.: degrees Centigrade
° F.: degrees Fahrenheit
cm: centimeter
LED: light emitting diode
mL: milliliter
mg: milligram
min.: minute
mm: millimeter
MW: molecular weight
nm: nanometer
rpm: revolutions per minute
$T_g$: glass transition temperature
$W/cm^2$: Watt per square centimeter
Wt %: weight percent Abbreviations for the Materials Used in the Examples are as Follows:
AC-380A: Part A of a two-part polysulfide-based sealant, obtained under the trade designation "AEROSPACE SEALANT AC-380 CLASS B-1/2" from 3M Company, St. Paul, Minn.
AC-730A: Part A of a two-part polysulfide-based sealant, obtained under the trade designation "AEROSPACE SEALANT AC-730 CLASS B-1/2" from 3M Company.
AO: Astrazon Orange G, a colorant available from Sigma-Aldrich Company.
BDGE: 1,4-Butanediol diglycidyl ether, obtained under the trade designation "DENACOL EX-214L" from Nagase America Corporation, New York, N.Y.
CB: Carbon black, obtained under the trade name designation "PIGMENT BLACK 7" from Keystone Aniline Corporation, Chicago, Ill.
CGI90: Photolatent base obtained from BASF Corp., Florham Park, N.J.
CHP: Cumene hydroperoxide (technical grade 80%) from Alfa Aesar, Ward Hill, Mass.
CPQ: Camphorquinone, a photosensitizer obtained from Sigma-Aldrich Company.
CROX: Chromium oxide green colorant, Color Index Green 17, obtained under the trade designation "CHROMIUM OXIDE GREEN" from Lansco Colors, Pearl River, N.Y.
DABCO-33: A 33% by weight solution of 1,4-Diazabicyclo [2.2.2]octane in dipropylene glycol, obtained under the trade designation "DABCO 33-LV" from Air Products & Chemicals, Inc., Allentown, Pa.
DMDO: 1,8-Dimercapto-3,6-dioxaoctane, obtained from Arkena, Inc., King of Prussia, Pa.
DMI: 1,2-dimethylimidazole obtained from Sigma-Aldrich Company.
DVE3: Triethyleneglycol divinylether from BASF Corp.
E8230: A bisphenol-based multifunctional epoxy, obtained under the trade designation "EPPALLOY 8230" from CVC Thermoset Specialties, Moorestown, N.J.
GE30: Trimethylolpropane triglycidylether, obtained under the trade designation "ERISYS GE-30" from Emerald Performance Materials, LLC, Cuyahoga Falls, Ohio.
IB: Indanthrone Blue, a colorant obtained from TCI America, Portland, Oreg.
I-819: A radical photoinitiator, obtained u nder the trade designation "IRGACURE 819" from BASF Corp.
LP33: A liquid polysulfide polymer, obtained under the trade designation "THIOKOL LP-33" from Toray Fine Chemicals Co., Ltd., Urayasu, Japan.
MY: Metanil Yellow, a colorant obtained from Alfa Aesar.
PR: Phenol Red Sodium Salt, a colorant obtained from Alfa Aesar.
PRB: Iron(III) hexacyanoferrate(II), also known as Prussian Blue, obtained from Alfa-Aesar.
PTE: A thiol terminated polythioether, synthesized as described below.
R202: A hydrophilic fumed silica, obtained under the trade designation "AEROSIL R202" from Evonik Industries AG, Essen, Germany.
SB: Solvent Blue 35, a colorant obtained from Sigma-Aldrich Company.
SOCAL: A precipitated calcium carbonate, obtained under the trade designation "SOCAL 322" from Solvay Chemicals, Inc., Houston, Tex.
TAC: Triallylcyanurate available under the trade designation "SR 507" from Sartomer, Exton, Pa.
UMB: Sodium aluminum sulphosilicate, obtained under the trade designation "ULTRAMARINE BLUE" from Ferro Corporation, Washington, Pa.
UPF: A surface-treated precipitated calcium carbonate, obtained under the trade designation "ULTRA-PFLEX 100" from Minerals Technologies, Inc. New York, N.Y.
VAZO-67: A radical thermal initiator available from Chemours Company, Wilmington, Del.
VTK: A quinacridone colorant, obtained under the trade designation "CINQUASIA VIOLET K 5350 FP" from BASF Corp.

PTE Synthesis

A thiol terminated polythioether oligomer with the equivalent weight of 1458 was synthesized as follows. Into a 12-liter round bottom flask equipped with an air-driven stirrer, thermometer, and a dropping funnel, was added 4,706 grams (25.8 moles) DMDO and 999 grams (3.0 moles) E-8220 at 21° C. 1.7 grams DABCO (15.2 mmoles) catalyst was added. The system was flushed with nitrogen and, with continuous stirring, held for four hours at between 60-70° C. 150 grams (0.6 mole) TAC was then added, along with approximately 0.4 grams VAZO-67, and stirring continued for approximately 3 hours at 60° C. 3,758 grams (18.6 moles) DVE3 was then added drop-wise to the flask over 4 hours, while maintaining the temperature between 60-70° C. An additional 1.2 grams VAZO-67 was then added in approximately 0.4 gram increments over approximately 8 hours. The temperature was then raised to 100° C. and the material degassed for approximately 1 hour. The resultant polythioether was approximately 3200 MW with 2.2 functionality.

Curable Sealant Precursors

A curable sealant precursor, CSP1, was prepared as follows. A 100 mL. glass jar was charged with 40.00 grams AC-730W, 1.76 grams E8230, 2.09 grams CGI90 and 2.92 grams CPQ. The vial was sealed, wrapped in aluminum foil and placed on a heated laboratory roller at 100° F. (37.8° C.) for 2 hours until the mixture dissolved. The mixture was then cooled to 70° F. (21.1° C.), transferred to a speed mixing jar, to which 1.41 grams GE30 and 0.27 grams DABCO were added. The contents were then speed mixed at 2000 rpm for 1 min until homogenous, after which the jar was immediately quenched in an ice bath to prevent thermal curing. Additional curable precursors were prepared as generally described in CSP1, according to the compositions listed in Table 1.

TABLE 1

| Curable Sealant Precursor | Composition (grams) | | | | | | | |
|---|---|---|---|---|---|---|---|---|
| | AC730W | E8230 | GE30 | CGI90 | CPQ | DABCO | BDGE | SOCAL |
| CSP1 | 40.00 | 1.76 | 1.42 | 2.09 | 2.92 | 0.27 | 0 | 0 |
| CSP2 | 50.00 | 0 | 1.52 | 2.58 | 3.61 | 0.34 | 1.32 | 0 |
| CSP3 | 30.00 | 0 | 3.74 | 1.11 | 1.11 | 0.19 | 3.25 | 15.83 |

| | Composition (grams) | | | | | | |
|---|---|---|---|---|---|---|---|
| | PTE | DMI | UPF | R202 | DVE3 | TAC | CHP | I-819 |
| CSP4 | 45.00 | 0.08 | 24.75 | 1.08 | 0 | 0 | 0 | 0 |
| CSP5 | 0 | 0 | 0 | 0.83 | 4.84 | 3.98 | 1.49 | 1.49 |

Example 1

A colored sealant was prepared as follows. 5 mg PRB was homogeneously dispersed in 2.45 grams of Curable Sealant Precursor CSP1 in a plastic cup by speed-mixing for 1 minute at 2000 rpm at 21° C.

Example 2

The procedure generally described for preparing Example 1 was repeated, according the composition listed in Table 2.

TABLE 2

| | CSP1 | Colorant | | |
|---|---|---|---|---|
| Sample | (grams) | Type | mg | Wt. % |
| Example 1 | 2.45 | PRB | 5.0 | 0.2 |
| Example 2 | 2.50 | PRB | 12.5 | 0.5 |

Approximately 1 gram each of CSP1, Examples 1 and 2 were manually spread onto two aluminum plates at 21° C. Approximate dimensions were 5 by 2 cm by 0.5 mm thick. The initial color was noted, after which one sample visibly cured by exposing to a 455 nm LED light, model "CT2000 LED", obtained from Clearstone Technologies, Inc., Hopkins, Minn., at approximately 75% power for 30 seconds at a distance of 1 inch (2.54 cm). A constant stream of air was directed over the sample during exposure to minimize heating. The other sample was completely covered and dark cured for 16 hours at 21° C. Table 3 lists the respective changes in color and degree of curing. With respect to the latter, rated on a scale of 1-4, where 1 represents no curing and 4 represents a fully cured sample.

TABLE 3

| | Color | | | Degree of Curing | |
|---|---|---|---|---|---|
| Sample | Initial | Dark Cured | Light Cured | Dark Cured | Light Cured |
| CSP1 | Yellow | Yellow | Dark red skin/yellow underneath | 4 | 2 |
| Example 1 | Green | Blue-Green | Brown skin/green underneath | 4 | 2 |
| Example 2 | Green | Blue-Green | Dark brown skin/green underneath | 4 | 3 |

Examples 3-5

Colored sealants were prepared and cured as generally described in Example 1, according to the compositions listed in Table 4. Results are listed in Table 5.

TABLE 4

| | CSP2 | Colorant | | |
|---|---|---|---|---|
| Sample | (grams) | Type | mg | Wt. % |
| Example 3 | 2.53 | PRB | 5.0 | 0.2 |
| Example 4 | 2.45 | PRB | 12.5 | 0.5 |
| Example 5 | 2.56 | PRB | 25.0 | 1.0 |

TABLE 5

| | Color | | | Physical Characteristics | |
|---|---|---|---|---|---|
| Sample | Initial | Dark Cured | Light Cured | Dark Cured | Light Cured |
| CSP1 | Yellow | Yellow | Dark red skin/yellow underneath | 4 | 2 |
| Example 3 | Light Green | Light Green | Red skin/light green underneath | 4 | 2 |
| Example 4 | Green | Green | Red-brown skin/green underneath | 4 | 2 |

TABLE 5-continued

| Sample | Color | | | Physical Characteristics | |
| --- | --- | --- | --- | --- | --- |
| | Initial | Dark Cured | Light Cured | Dark Cured | Light Cured |
| Example 5 | Dark Green | Dark Green | Brown skin | 4 | 2 |

Examples 6-9

Colored sealants were prepared and cured as generally described in Example 1, according to the compositions listed in Table 6. Resultant curable colorant compositions, and corresponding curable sealant precursor CSP3, were formed into 66 mil (1.68 mm) thick samples by means of a silicone rubber gasket sandwiched between two 2 by 3 inch (5.08 by 7.12 cm) clean microscope slides. L*a*b* values were measured using a model "ULTRASCAN PRO COLORIMETER", obtained from Hunter Laboratories, Reston, Va., after which the samples were dark and light cured as generally described in Example 1. With respect to visible light curing, the exposure was increased from 30 seconds to 1 minute. L*a*b* values of the cured samples were immediately measured, and again after 4 days, from which Δa values were determined. Results are listed in Table 7.

TABLE 6

| Sample | CSP3 (grams) | Colorant | | |
| --- | --- | --- | --- | --- |
| | | Type | mg | Wt. % |
| Example 6 | 8.00 | PRB | 40.0 | 0.5 |
| Example 7 | 8.00 | VTK | 40.0 | 0.5 |
| Example 8 | 8.00 | CROX | 40.0 | 0.5 |
| Example 9 | 8.00 | UMB | 40.0 | 0.5 |

TABLE 7

| Sample | L*a*b* Measurement | L* | a | b | Photo-cured Δa* |
| --- | --- | --- | --- | --- | --- |
| CSP3 | Before Dark Curing | 80.86 | 0.42 | 40.6 | |
| CSP3 | Dark Cured @ 4 Days | 81.8 | −0.69 | 47.41 | |
| CSP3 | Before Light Curing | 80.79 | 0.39 | 41.45 | |
| CSP3 | After Light Curing | 71.87 | 12.53 | 28.35 | 12.14 |
| CSP3 | Light Cured @ 4 Days | 72.26 | 9.94 | 34.34 | |
| Example 6 | Before Dark Curing | 47.18 | −13.06 | −7.85 | |
| Example 6 | Dark Cured @ 4 Days | 45.56 | −10.11 | −5.97 | |
| Example 6 | Before Light Curing | 46.4 | −13.05 | −8.06 | |
| Example 6 | After Light Curing | 53.97 | −1.3 | 7.69 | 11.75 |
| Example 6 | Light Cured @ 4 Days | 49.58 | −4.84 | 5.97 | |
| Example 7 | Before Dark Curing | 34.68 | 27.99 | −2.99 | |
| Example 7 | Dark Cured @ 4 Days | 34.15 | 26.08 | −2.99 | |
| Example 7 | Before Light Curing | 34.46 | 28.29 | −2.87 | |
| Example 7 | After Light Curing | 33.46 | 23.17 | −2.39 | −5.12 |
| Example 7 | Light Cured @ 4 Days | 33.54 | 23.47 | −1.68 | |
| Example 8 | Before Dark Curing | 54.56 | −13.74 | 17.22 | |
| Example 8 | Dark Cured @ 4 Days | 54.29 | −14.09 | 18.29 | |
| Example 8 | Before Light Curing | 54.34 | −13.89 | 17.52 | |
| Example 8 | After Light Curing | 51.61 | −9.04 | 16.48 | 4.85 |
| Example 8 | Light Cured @ 4 Days | 51.96 | −11 | 18.66 | |
| Example 9 | Before Dark Curing | 52.23 | −8.52 | −8.17 | |
| Example 9 | Dark Cured @ 4 Days | 51.61 | −9.66 | −5.01 | |
| Example 9 | Before Light Curing | 52.36 | −8.49 | −7.85 | |
| Example 9 | After Light Curing | 49.46 | −5.02 | −6.6 | 3.47 |
| Example 9 | Light Cured @ 4 Days | 49.45 | −7.42 | −2.26 | |

Examples 10-13 and Comparatives A-D

Colored sealant samples were prepared as generally described in Example 1, according to the compositions listed in Table 8. Each sample was used to make three molded specimens which were cured and measured according to the Light-Curing Method of Molded Samples above.

A 12 mm diameter by 6.35 mm deep cylindrical silicone rubber mold was placed on a glass slide and loaded with a given sealant sample. Each molded specimen was irradiated with a 7 by 7 array of 450 nm LED's, at a distance of approximately 1 inch (2.54 cm) and 1.2 W/cm$^2$, for 15 seconds. Following this, the cured disc of sealant (if any) was removed from the mold and the excess uncured sealant removed from it with a glass slide. The resulting disc was allowed to sit at room temperature for 16 hours, after which time its thickness was measured with a Fisher Scientific caliper micrometer. Results listed in Table 9 represent an average of 3 samples.

TABLE 8

| Sample | CSP4 (grams) | CSP5 (grams) | Colorant | | |
| --- | --- | --- | --- | --- | --- |
| | | | Type | mg | Wt. % |
| Example 10 | 8.00 | 0.46 | IB | 25.0 | 0.3 |
| Example 11 | 8.00 | 0.46 | PRB | 25.0 | 0.3 |
| Example 12 | 8.00 | 0.46 | PR | 25.0 | 0.3 |
| Example 13 | 8.00 | 0.46 | AO | 25.0 | 0.3 |
| Comparative A | 8.00 | 0.46 | None | 0 | 0 |
| Comparative B | 8.00 | 0.46 | SB | 25.0 | 0.3 |
| Comparative C | 8.00 | 0.46 | MY | 25.0 | 0.3 |
| Comparative D | 8.00 | 0.46 | CB | 25.0 | 0.3 |

TABLE 9

| Sample | Average Cure Thickness (inches/mm) |
| --- | --- |
| Example 10 | 0.072/1.83 |
| Example 11 | 0.075/1.91 |
| Example 12 | 0.097/2.46 |
| Example 13 | 0.051/1.30 |
| Comparative A | 0.150/3.81 |
| Comparative B | Not Cured |
| Comparative C | Not Cured |
| Comparative D | Not Cured |

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A sealant composition comprising:
   a first component comprising a polysulfide, a polythioether, or a copolymer or combination thereof containing pendant or terminal thiol groups; and
   a second component comprising an ethylenically-unsaturated compound,
   wherein the first or second component further comprises:
   a photoinitiator; and a colorant in the first or second component that substantially reflects or substantially transmits light over the wavelength range from 350 nm to 500 nm, wherein the first and second components are part of a two-part composition whereby the sealant composition can be chemically cured upon mixing and further wherein the colorant provides a visual contrast between the first and second components prior to mixing.

2. The sealant composition of claim 1, wherein the second component further comprises a peroxide.

3. The sealant composition of claim 2, wherein the peroxide comprises a hydroperoxide.

4. The sealant composition of claim 2, wherein the second component further comprises an amine, wherein the peroxide and amine collectively provide a redox initiator.

5. The sealant composition of claim 1, wherein the ethylenically-unsaturated compound comprises more than one carbon-carbon double bond or a carbon-carbon triple bond.

6. A sealant composition comprising:
   a first component comprising a polysulfide, a polythioether, or a copolymer or combination thereof containing pendant or terminal thiol groups; and
   a second component comprising a polyepoxide,
   wherein the first or second component further comprises a photolatent base, a photosensitizer and a colorant that substantially reflects or substantially transmits light over the wavelength range from 350 nm to 500 nm, wherein the first and second components are part of a two-part composition whereby the sealant composition can be chemically cured upon mixing and further wherein the colorant provides a visual contrast between the first and second components prior to mixing.

7. The sealant composition of claim 6, wherein the photolatent base is capable of photochemically generating a first amine.

8. The sealant composition of claim 7, wherein the first component further comprises a second amine that is phase-separated within the composition and a third amine that is not phase-separated within the composition.

9. The sealant composition of claim 1, wherein the colorant substantially reflects or transmits light over the wavelength range from 370 nm to 480 nm.

10. The sealant composition of claim 9, wherein the colorant substantially reflects or transmits light over the wavelength range from 400 nm to 470 nm.

11. The sealant composition of claim 1, wherein the colorant is selected from iron(III) hexacyanoferrate(II), Cinquasia Violet K 5350 FP, Indanthrone Blue, Ultramarine Blue, and combinations thereof.

12. The sealant composition of claim 1, wherein the colorant displays a molar extinction coefficient with respect to monochromatic light at a wavelength of 450 nm of from $0\ M^{-1}cm^{-1}$ to $20,000\ M^{-1}cm^{-1}$ in its respective component.

13. A method of curing a sealant composition, the method comprising:
   providing the sealant composition of claim 1;
   mixing the first and second components with each other; and
   at least one of:
      exposing a photoinitiator present in the first or second component to visible light to initiate curing of the sealant composition; or
      allowing the mixed composition to at least partially cure over time under ambient conditions.

14. A method of curing a sealant composition, the method comprising:
   providing the sealant composition of claim 6;
   mixing the first and second components with each other; and
   at least one of:
      exposing a photolatent base present in the first or second component to visible light to generate a first amine, whereby the first amine catalyzes curing of the sealant composition; or
      allowing the mixed composition to at least partially cure over time under ambient conditions.

15. The method of claim 13, wherein the visible light has a primary wavelength of from 400 nm to 700 nm.

* * * * *

UNITED STATES PATENT AND TRADEMARK OFFICE
CERTIFICATE OF CORRECTION

PATENT NO. : 10,858,558 B2
APPLICATION NO. : 16/340365
DATED : December 8, 2020
INVENTOR(S) : Erik Townsend et al.

Page 1 of 1

It is certified that error appears in the above-identified patent and that said Letters Patent is hereby corrected as shown below:

On the Title Page

In Column 1, Item (22) Under "(PCT Filed)"
Line 1, delete "Nov. 3, 2017" and insert -- Oct. 30, 2017 --, therefor.

In Column 2, Under "(Abstract)"
Line 5, after "second" delete "in".

In the Specification

Column 1
Line 9, delete "the," and insert -- the --, therefor.

Column 7
Line 3, delete "sub stituents." and insert -- substituents. --, therefor.

Column 11
Line 61, delete "-bi s(" and insert -- -bis( --, therefor.

Column 13
Line 39, delete "0-acyloximes," and insert -- O-acyloximes, --, therefor.

Column 14
Line 16, delete "C1-C8" and insert -- C1-C18 --, therefor.

Column 17
Line 51, delete ""CAB-0-5Th" and insert -- ("CAB-O-SIL --, therefor.

Signed and Sealed this
Second Day of February, 2021

Drew Hirshfeld
*Performing the Functions and Duties of the*
*Under Secretary of Commerce for Intellectual Property and*
*Director of the United States Patent and Trademark Office*